US012143882B2

(12) United States Patent
Vadapalli et al.

(10) Patent No.: US 12,143,882 B2
(45) Date of Patent: Nov. 12, 2024

(54) INTELLIGENT TRANSMISSION SELECTION FOR ENHANCING UPLINK PERFORMANCE

(71) Applicant: QUALCOMM Incorporated, San Diego, CA (US)

(72) Inventors: Syam Pavan Vadapalli, Visakhapatnam (IN); Roop Sagar Inakollu, Nellore (IN); Parshu Ramulu Chintakindi, Hyderabad (IN); AnkammaRao Ravuvari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/470,852

(22) Filed: Sep. 9, 2021

(65) Prior Publication Data

US 2023/0073335 A1    Mar. 9, 2023

(51) Int. Cl.
*H04W 36/30* (2009.01)
*H04W 72/21* (2023.01)
*H04W 72/23* (2023.01)

(52) U.S. Cl.
CPC ........... *H04W 36/30* (2013.01); *H04W 72/21* (2023.01); *H04W 72/23* (2023.01)

(58) Field of Classification Search
CPC ................. H04W 36/30; H04W 40/16; H04W 72/12–50; H04W 72/1268; H04W 72/541; H04W 72/563; H04W 76/20; H04W 72/0413; H04W 76/27; H04W 88/06; H04W 72/20; H04W 72/0453; H04W 60/005; H04W 36/14; H04W 72/21; H04W 72/23; H04W 72/14
See application file for complete search history.

(56) References Cited

U.S. PATENT DOCUMENTS

2016/0050685 A1*   2/2016   Krishnamoorthi .. H04W 72/566
                                                    370/329
2016/0134316 A1*   5/2016   Mohan ................. H04B 1/3816
                                                    455/558

(Continued)

FOREIGN PATENT DOCUMENTS

EP    3344000 B1 *   7/2018   ............ H04W 76/16

OTHER PUBLICATIONS

"TS 38.822 V15.0.0" Jun. 2019; hereinafter 3GPP (Year: 2019).*
3GPP TS 38.822 V15.0.0 (Jun. 2019) (Year: 2019).*

*Primary Examiner* — Ricky Q Ngo
*Assistant Examiner* — David M Kayal
(74) *Attorney, Agent, or Firm* — Holland & Hart LLP

(57) ABSTRACT

Methods, systems, and devices for wireless communications are described. In a wireless communications system, a user equipment (UE) may use intelligent transmission selection for enhancing uplink performance. The UE may identify a quantity of tuneaway occasions in which the UE is to tune away at least one radio frequency (RF) chain of multiple RF chain from a first subscription to a second subscription. The UE may identify a conflict for an uplink transmission associated with the first subscription during a first tuneaway occasion. The UE may switch the uplink transmission from one or more first RF chains to one or more available second RF chains based on the conflict, and the UE may transmit the uplink transmission using the one or more available second RF chains based on the switching.

30 Claims, 14 Drawing Sheets

(56) References Cited

U.S. PATENT DOCUMENTS

| | | | | |
|---|---|---|---|---|
| 2016/0365912 | A1* | 12/2016 | Yang | H04W 8/183 |
| 2018/0176765 | A1* | 6/2018 | Bharadwaj | H04W 8/183 |
| 2018/0368098 | A1* | 12/2018 | Gopal | H04W 68/02 |
| 2020/0092898 | A1* | 3/2020 | Ozaki | H04W 72/542 |
| 2021/0014667 | A1* | 1/2021 | Lovlekar | H04W 12/72 |
| 2022/0166471 | A1* | 5/2022 | Abraha | H04W 4/025 |
| 2023/0163820 | A1* | 5/2023 | El-Keyi | H04B 7/0695 |
| | | | | 370/329 |

* cited by examiner

INTELLIGENT TRANSMISSION SELECTION FOR ENHANCING UPLINK PERFORMANCE

FIELD OF TECHNOLOGY

The following relates to wireless communications, including intelligent transmission selection for enhancing uplink performance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support intelligent transmission selection for enhancing uplink performance. Generally, the described techniques provide for a user equipment (UE) to use intelligent transmission selection for enhancing uplink performance. For example, if a conflict occurs between a default data subscription (DDS) (e.g., a first subscription) performing uplink multiple-input multiple-output (MIMO) communications and a non-DDS (nDDS) (e.g., a second subscription) performing idle mode activities, the UE may switch an uplink transmission path of the DDS from one or more first radio frequency (RF) chains (e.g., and one or more corresponding antenna ports) to one or more available different RF chains (e.g., and one or more corresponding antenna ports) instead of dropping the uplink transmission in favor of performing the idle mode activity on the one or more first RF chains. By switching the uplink transmission path, the UE may avoid interference (e.g., a conflict, a tuneaway gap) and a subsequent outage on the one or more first RF chains, and the UE may continue to use both the one or more first RF chains and the one or more different RF chains.

The UE may be configured with multiple tuneaway occasions in which the UE may tune away at least one RF chain from the DDS to the nDDS. The UE may detect a conflict with an uplink transmission associated with the DDS during a first tuneaway occasion, and the UE may switch the uplink transmission from one or more first RF chains to one or more available different RF chains to avoid the conflict. The UE may transmit the uplink transmission using the one or more available different RF chains, and the UE may continue to use the one or more first RF chains for other activities (e.g., idle mode activities by the nDDS) during the first tuneaway occasion. That is, the UE may utilize both RF chains, thus improving uplink throughput performance during the tuneaway occasions as the UE may refrain from dropping the uplink transmission to avoid the conflict (e.g., the UE may avoid an outage for the DDS).

A method is described. The method may include identifying a set of multiple tuneaway occasions in which the UE is to tune away at least one RF chain of a set of multiple RF chains from a first subscription to a second subscription, identifying a conflict for an uplink transmission associated with the first subscription during a first tuneaway occasion of the set of multiple tuneaway occasions, switching the uplink transmission from one or more first RF chains to one or more available second RF chains of the set of multiple RF chains based on the conflict, and transmitting the uplink transmission using the one or more available second RF chains based on the switching.

An apparatus is described. The apparatus may include a processor, memory coupled with the processor, and instructions stored in the memory. The instructions may be executable by the processor to cause the apparatus to identify a set of multiple tuneaway occasions in which the UE is to tune away at least one RF chain of a set of multiple RF chains from a first subscription to a second subscription, identify a conflict for an uplink transmission associated with the first subscription during a first tuneaway occasion of the set of multiple tuneaway occasions, switch the uplink transmission from one or more first RF chains to one or more available second RF chains of the set of multiple RF chains based on the conflict, and transmit the uplink transmission using the one or more available second RF chains based on the switching.

Another apparatus is described. The apparatus may include means for identifying a set of multiple tuneaway occasions in which the UE is to tune away at least one RF chain of a set of multiple RF chains from a first subscription to a second subscription, means for identifying a conflict for an uplink transmission associated with the first subscription during a first tuneaway occasion of the set of multiple tuneaway occasions, means for switching the uplink transmission from one or more first RF chains to one or more available second RF chains of the set of multiple RF chains based on the conflict, and means for transmitting the uplink transmission using the one or more available second RF chains based on the switching.

A non-transitory computer-readable medium storing code is described. The code may include instructions executable by a processor to identify a set of multiple tuneaway occasions in which the UE is to tune away at least one RF chain of a set of multiple RF chains from a first subscription to a second subscription, identify a conflict for an uplink transmission associated with the first subscription during a first tuneaway occasion of the set of multiple tuneaway occasions, switch the uplink transmission from one or more first RF chains to one or more available second RF chains of the set of multiple RF chains based on the conflict, and transmit the uplink transmission using the one or more available second RF chains based on the switching.

Some examples of the method, apparatuses, and non-transitory computer-readable medium described herein may further include operations, features, means, or instructions for transmitting a scheduling request associated with the first subscription, receiving an uplink grant scheduling the uplink transmission based on the scheduling request, and identifying the conflict for the uplink transmission during the first tuneaway occasion based on the uplink grant.

Some examples of the method, apparatuses, and non-transitory computer-readable medium described herein may further include operations, features, means, or instructions for identifying that the second subscription may utilize a single RF chain during the first tuneaway occasion and identifying the conflict for the uplink transmission based on the first subscription and the second subscription both being configured to communicate using a first RF chain during the first tuneaway occasion.

Some examples of the method, apparatuses, and non-transitory computer-readable medium described herein may further include operations, features, means, or instructions for receiving an uplink grant indicating that the uplink transmission may be precoded for transmission on a single spatial layer via two or more of the set of multiple RF chains, where the conflict may be identified based on the uplink grant.

Some examples of the method, apparatuses, and non-transitory computer-readable medium described herein may further include operations, features, means, or instructions for identifying that the second subscription may utilize at least two RF chains of the set of multiple RF chains during the first tuneaway occasion and identifying the conflict for the uplink transmission during the first tuneaway occasion based on the first subscription and the second subscription both being configured to communicate using one or more of the at least two RF chains during the first tuneaway occasion.

Some examples of the method, apparatuses, and non-transitory computer-readable medium described herein may further include operations, features, means, or instructions for receiving an uplink grant indicating that the uplink transmission may be precoded for transmission via two or more RF chains of the set of multiple RF chains based on a scheduling request.

Some examples of the method, apparatuses, and non-transitory computer-readable medium described herein may further include operations, features, means, or instructions for identifying that the second subscription may utilize a single RF chain of the set of multiple RF chains during the first tuneaway occasion, where the uplink transmission may be a single layer transmission and identifying the conflict for the uplink transmission during the first tuneaway occasion based on the first subscription and the second subscription both being configured to communicate using a first RF chain during the first tuneaway occasion.

Some examples of the method, apparatuses, and non-transitory computer-readable medium described herein may further include operations, features, means, or instructions for receiving an uplink grant indicating that the uplink transmission may be precoded for transmission via one RF chain of the set of multiple RF chains based on a scheduling request, where the conflict may be identified based on the uplink grant.

Some examples of the method, apparatuses, and non-transitory computer-readable medium described herein may further include operations, features, means, or instructions for identifying that the second subscription may utilize at least two RF chains of the set of multiple RF chains during the first tuneaway occasion, where the uplink transmission may be a single layer transmission and identifying the conflict for the uplink transmission during the first tuneaway occasion based on the first subscription and the second subscription both being configured to communicate using one or more of the at least two RF chains during the first tuneaway occasion.

Some examples of the method, apparatuses, and non-transitory computer-readable medium described herein may further include operations, features, means, or instructions for receiving an uplink grant indicating that the uplink transmission may be precoded for transmission via two or more RF chains of the set of multiple RF chains based on a scheduling request, where the conflict may be identified based on the uplink grant.

Some examples of the method, apparatuses, and non-transitory computer-readable medium described herein may further include operations, features, means, or instructions for identifying that the second subscription may utilize at least two RF chains of the set of multiple RF chains during the first tuneaway occasion, where the uplink transmission may be a multiple layer transmission and identifying the conflict for the uplink transmission during the first tuneaway occasion based on the first subscription and the second subscription both being configured to communicate using one or more of the at least two RF chains during the first tuneaway occasion.

Some examples of the method, apparatuses, and non-transitory computer-readable medium described herein may further include operations, features, means, or instructions for receiving an uplink grant indicating that the uplink transmission may be precoded for transmission via two or more RF chains of the set of multiple RF chains based on a scheduling request, where the conflict may be identified based on the uplink grant.

Some examples of the method, apparatuses, and non-transitory computer-readable medium described herein may further include operations, features, means, or instructions for transmitting a channel state feedback report indicating support for a defined transmission rank during the first tuneaway occasion and receiving a downlink grant scheduling a downlink transmission during the first tuneaway occasion in accordance with the defined transmission rank.

Some examples of the method, apparatuses, and non-transitory computer-readable medium described herein may further include operations, features, means, or instructions for communicating a second uplink transmission of the first subscription via the first RF chains subsequent to the first tuneaway occasion.

In some examples of the method, apparatuses, and non-transitory computer-readable medium described herein, the first subscription may be a DDS and the second subscription may be an nDDS or where the first subscription may be the nDDS and the second subscription may be the DDS.

In some examples of the method, apparatuses, and non-transitory computer-readable medium described herein, each of the set of multiple tuneaway occasions correspond to an idle mode activity associated with the second subscription that may be an nDDS.

In some examples of the method, apparatuses, and non-transitory computer-readable medium described herein, the idle mode activity includes page decoding, a cell search, a measurement, or any combination thereof.

DETAILED DESCRIPTION

Figure 1:
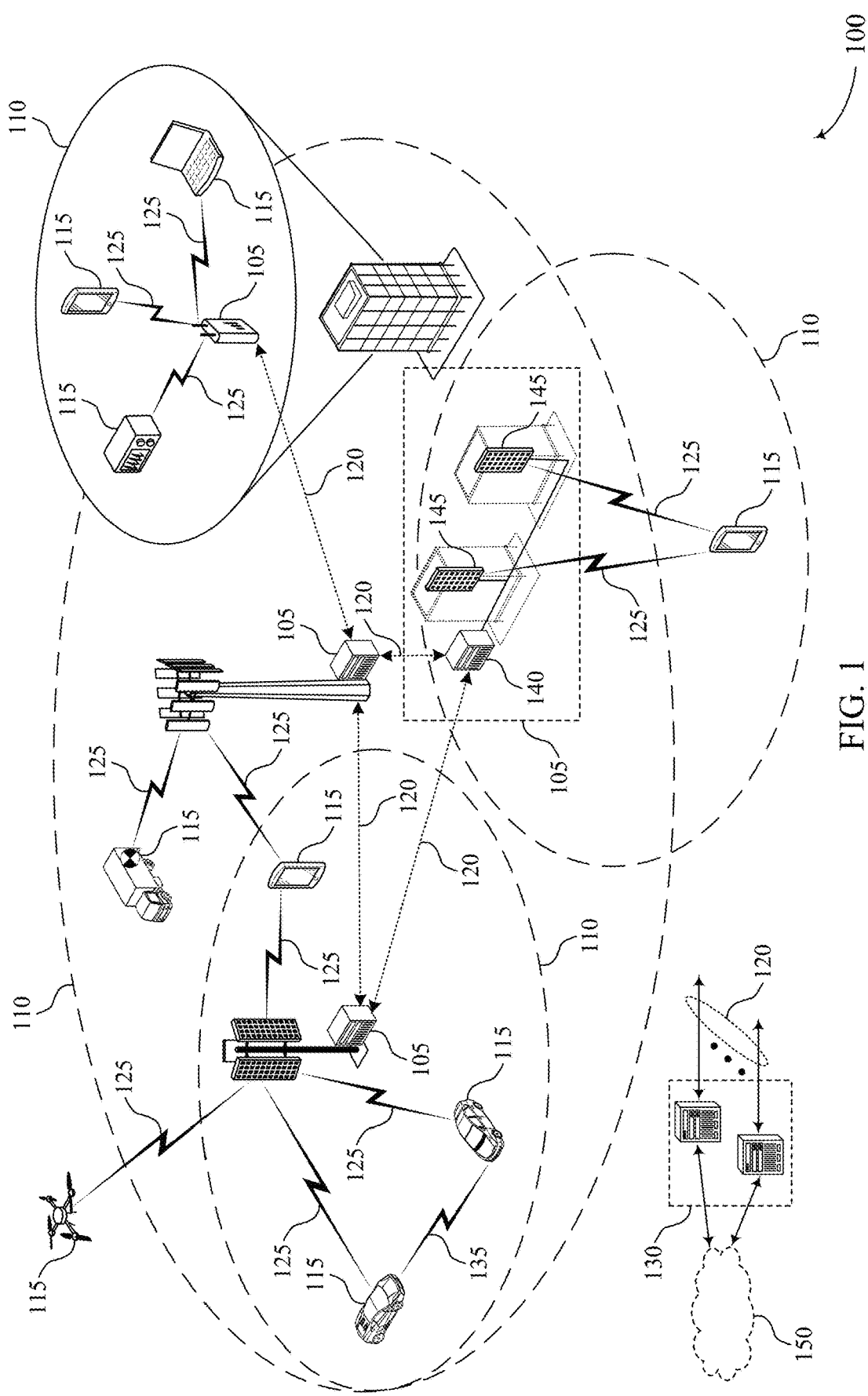
FIG. 1 illustrates an example of a wireless communications system that supports intelligent transmission selection for enhancing uplink performance in accordance with aspects of the present disclosure.

In some wireless communications systems, a user equipment (UE) may be associated with a first subscription and a second subscription. For example, the UE may be a multi-subscriber identity module (MSIM) UE, where the first subscription may correspond to a default data subscription (DDS) and the second subscription may correspond to a non-DDS (nDDS). In some examples, the DDS and the nDDS may share a limited quantity of resources, including radio frequency (RF) chains and antenna ports, among others. As such, the UE may perform a tuneaway procedure where the nDDS may take away one or more shared RF chains from the DDS to perform idle mode activities including page decoding, a cell search, and a measurement, or any combination thereof. In some examples, an idle mode activity may be triggered on the nDDS, and a conflict may occur between uplink transmissions associated with the DDS and the idle mode activity associated with the nDDS. For example, during uplink multiple-input multiple-output (MIMO) communications, the conflict may occur between transmit chains of the DDS and receive chains of the nDDS. Based on the conflict, the DDS may release the one or more conflicting RF chains to the nDDS for the nDDS to perform the idle mode activity. However, by releasing the RF chains to the nDDS, the DDS may drop uplink MIMO transmissions, which may lead to uplink transmission outages and high throughput loss as the DDS may fail to perform uplink MIMO communications with a base station.

Techniques described herein enable a UE to use intelligent transmission selection for enhancing uplink performance. For example, if a conflict occurs between a DDS (e.g., a first subscription) performing uplink MIMO communications and an nDDS (e.g., a second subscription) performing idle mode activities, the UE may switch an uplink transmission path of the DDS from one or more first RF chains (e.g., and one or more corresponding antenna ports) to one or more available different RF chains (e.g., and one or more corresponding antenna ports) instead of dropping the uplink transmission in favor of performing the idle mode activity on the one or more first RF chains. By switching the uplink transmission path, the UE may avoid interference (e.g., a conflict, a tuneaway gap) and a subsequent outage on the one or more first RF chains, and the UE may continue to use both the one or more first RF chains and the one or more different RF chains.

The UE may be configured with multiple tuneaway occasions in which the UE may tune away at least one RF chain from the DDS to the nDDS. The UE may detect a conflict with an uplink transmission associated with the DDS during a first tuneaway occasion, and the UE may switch the uplink transmission from one or more first RF chains to one or more available different RF chains to avoid the conflict. The UE may transmit the uplink transmission using the one or more available different RF chains, and the UE may continue to the one or more first RF chains for other activities (e.g., idle mode activities by the nDDS) during the first tuneaway occasion. That is, the UE may utilize both RF chains, thus improving uplink throughput performance during the tuneaway occasions as the UE may refrain from dropping the uplink transmission to avoid the conflict (e.g., the UE may avoid an outage for the DDS).

Aspects of the disclosure are initially described in the context of wireless communications systems. Aspects of the disclosure are then described in the context of tuneaway schemes and a process flow. Aspects of the disclosure are further illustrated by and described with reference to apparatus diagrams, system diagrams, and flowcharts that relate to intelligent transmission selection for enhancing uplink performance.

FIG. 1 illustrates an example of a wireless communications system 100 that supports intelligent transmission selection for enhancing uplink performance in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100, a UE 115 may be associated with a first subscription and a second subscription. For example, the UE 115 may be an MSIM UE, where the first subscription may correspond to a DDS and the second subscription may correspond to an nDDS. The UE 115 may use the DDS for data applications (e.g., navigation, email, applications) and the UE 115 may use the nDDS, which may be in an idle mode at most times, for receiving voice calls. In some examples, the MSIM UE may support different subscriptions. The UE 115 may perform MSIM tuneaway, which may involve outages in one or more RF receiver chains. During tuneaway, the UE 115 may support enough RF chains (e.g., corresponding antenna ports) on the DDS such that the DDS may give away two RF chains to the nDDS and the UE 115 may still attempt to decode some data on the DDS using the remaining RF chains. For example, the UE 115 may support a limited quantity of RF chains, which may be shared by the DDS and the nDDS (e.g., shared by more than one SIM). As such, the nDDS may take away one or more RF chains from the DDS to perform idle mode activities. In some examples, when a single RF chain is being shared by the DDS and the nDDS, the UE 115 may use dual-SIM dual-standby (DSDS) to facilitate sharing of the RF chains. Using DSDS, the DDS may use the RF chains to perform an activity and the nDDS may wait to use the RF chains until the DDS has completed the activity.

In some examples, when there is a conflict between the DDS and the nDDS on one or more RF chains, the DDS may release the one or more RF chains to the nDDS to accomplish the idle mode activities, which may include page decoding, a cell search, a measurement, or any combination thereof. When an idle mode activity is triggered on the nDDS, and if there is a conflict between one or more RF chains on the DDS and the nDDS, the DDS may release the one or more RF chains experiencing the conflict to the nDDS. For example, the DDS may have four RF chains (e.g., corresponding to four antenna ports), and may give away two RF chains to the nDDS. However, if one of the RF chains given away to the nDDS is coupled with transmissions from the DDS, a conflict may occur for uplink transmissions on that coupled RF chain.

Due to the frequent idle mode activities on the nDDS, the DDS may suffer high uplink transmission outages, particularly when operating in uplink MIMO communications, because of the conflicts between RF chains used for transmission for the DDS and reception for the nDDS. For example, the DDS may use two or more transmit RF chains for uplink MIMO. If the nDDS takes away one of the transmit RF chains from the DDS to perform an idle mode activity, the DDS may be left with one transmit RF chain to perform uplink MIMO activities. As such, a base station may fail to decode any transmissions from the DDS because the base station may expect to receive transmissions via multiple RF chains. As such, if there arises a conflict between the DDS and the nDDS during uplink MIMO (e.g., if the DDS is uplink MIMO, where a spatial multiplexing dual layer (SMDL) or spatial multiplexing single layer (SMSL) plus transmitted precoding matrix indicator (TPMI) is one is active), an uplink transmission (e.g., physical uplink shared channel (PUSCH) transmission) may be dropped, creating an outage in uplink transmissions and subsequent throughput loss.

A UE 115 may use intelligent transmission selection for enhancing uplink performance. For example, if a conflict occurs between a DDS (e.g., a first subscription) performing uplink MIMO communications and an nDDS (e.g., a second subscription) performing idle mode activities, the UE 115 may switch an uplink transmission path of the DDS from one or more first RF chains (e.g., and one or more corresponding antenna ports) to one or more available different RF chains (e.g., and one or more corresponding antenna ports) instead of dropping the uplink transmission in favor of performing the idle mode activity on the one or more first RF chains. By switching the uplink transmission path, the UE 115 may avoid interference (e.g., a conflict, a tuneaway gap) and a subsequent outage on the one or more first RF chains, and the UE 115 may continue to use both the one or more first RF chains and the one or more different RF chains.

The UE 115 may be configured with multiple tuneaway occasions in which the UE 115 may tune away at least one RF chain from the DDS to the nDDS. The UE 115 may detect a conflict with an uplink transmission associated with the DDS during a first tuneaway occasion, and the UE 115 may switch the uplink transmission from one or more first RF chains to one or more available different RF chains to avoid the conflict. The UE 115 may transmit the uplink transmission using the one or more available different RF chains, and the UE 115 may continue to the one or more first RF chains for other activities (e.g., idle mode activities by the nDDS) during the first tuneaway occasion. That is, the UE 115 may utilize both RF chains, thus improving uplink throughput performance during the tuneaway occasions as the UE 115 may refrain from dropping the uplink transmission to avoid the conflict (e.g., the UE may avoid an outage for the DDS).

Figure 2:
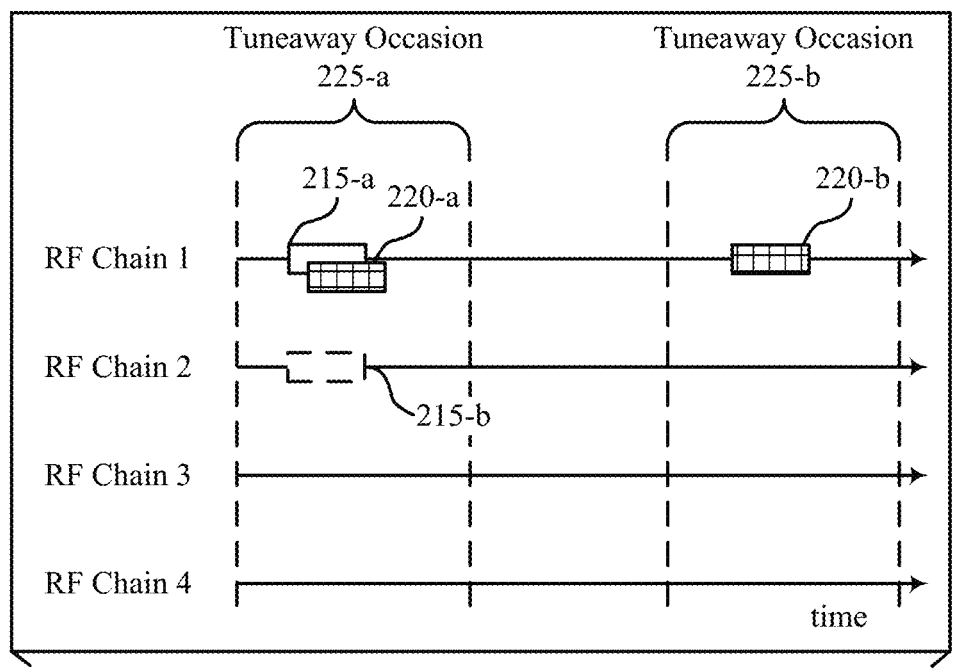
FIG. 2 illustrates an example of a wireless communications system that supports intelligent transmission selection for enhancing uplink performance in accordance with aspects of the present disclosure.
Figure 2:
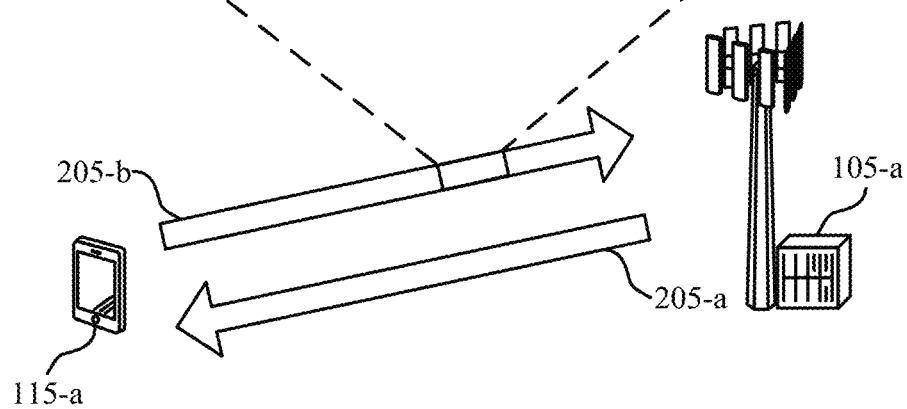

FIG. 2 illustrates an example of a wireless communications system 200 that supports intelligent transmission selection for enhancing uplink performance in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a base station 105-*a*, which may be examples of corresponding devices described herein. The wireless communications system 200 may include features for improved communications between the UE 115-*a* and the base station 105-*a*.

The UE 115-*a* may be associated with a first subscription and a second subscription. For example, the UE 115-*a* may be an MSIM UE, where the first subscription may correspond to a DDS and the second subscription may correspond to an nDDS, or where the first subscription may correspond to the nDDS and the second subscription may correspond to the nDDS. Additionally or alternatively, the UE 115-a may be associated with different subscriptions. The UE 115-a may communicate with the base station 105-a via communications links 205. For example, the UE 115-a may receive downlink transmissions on a communications link 205-a using one or more RF chains, and the UE 115-a may transmit uplink transmissions on a communications link 205-b using one or more RF chains. The RF chains may be used to generate and transmit the uplink transmissions for the UE 115-a. For example, an RF chain of the UE 115-a may include one or more signal generation components (e.g., an amplifier, mixer, modulator, mapper, etc., used to generate an uplink transmission) that includes an antenna component (e.g., an antenna port) by which the uplink transmission is emitted, and defines a path through the UE 115-a. Thus, in some cases, the one or more signal generation components may be unable to be shared between uplink and downlink transmissions, or between multiple uplink transmissions, or between multiple downlink transmissions, and as such one of the DDS or the nDDS, but not both, may use a particular RF chain at a time. For example, a conflict may occur between the DDS and the nDDS on an RF chain, where the DDS may be in UL MIMO, and where uplink transmissions may be precoded on a single spatial layer (e.g., SMSL+TPMI=1) or on multiple spatial layers (e.g., SMDL). The conflict may occur at any component of the RF chain, for example at a signal component or at an antenna component. Because of the conflict, the RF chain (e.g., Tx1 chain) or an antenna port corresponding to the RF chain may undergo an outage due to the UE 115-a tuning away to a different RF chain.

The wireless communications system 200 may support techniques for intelligent transmission selection for enhancing uplink performance. For example, the UE 115-a may utilize different RF chains during a tuneaway occasion to increase uplink transmission throughput. In some examples, the DDS may detect an upcoming tuneaway gap (e.g., an upcoming conflict) and the DDS may intelligently switch the uplink transmission path (e.g., Tx1 chain) to a different RF chain and corresponding antenna port to overcome the outage. That is, the DDS may detect that the UE 115-a may tune away from the RF chain (e.g., one or more RF chains) to avoid a conflict with the nDDS. To avoid the subsequent gap in uplink transmissions on the RF chain and the dropping of the uplink transmission in favor or an idle mode activity for the nDDS on the RF chain, the UE 115-a may switch the uplink transmission to a different RF chain (e.g., one or more available RF chains that the nDDS may refrain from using during the tuneaway occasion), and may thus continue to use the RF chain for the idle mode activity without experiencing throughput loss on either RF chain.

In some examples, the UE 115-a may have multiple tuneaway occasions 225 in which the UE 115-a may tune away at least one RF chain (e.g., an RF chain and corresponding antenna port) of multiple RF chains from the DDS to the nDDS. For example, the UE 115-a may have four RF chains (e.g., an RF chain 1, an RF chain 2, an RF chain 3, and an RF chain 4), which may each correspond to an antenna port. The UE 115-a may identify a conflict for an uplink transmission 215 associated with the DDS during a tuneaway occasion 225-a (e.g., a first tuneaway occasion). In some examples, the conflict may occur on the RF chain 1 between an uplink transmission 215-a associated with the DDS and an idle mode activity 220-a associated with the nDDS, such as page decoding, a cell search, a measurement, or any combination thereof.

Based on the conflict between the uplink transmission 215-a and the idle mode activity 220-a, the UE 115-a may switch the uplink transmission 215-a from one or more first RF chains (e.g., the RF chain 1 and a corresponding antenna port) to one or more available second RF chains (e.g., the RF chain 2 and a corresponding antenna port) of the multiple RF chains. For example, the UE 115-a may switch the uplink transmission 215-a to an uplink transmission 215-b on the RF chain 2. That is, instead of dropping the uplink transmission 215-a in favor of proceeding with the idle mode activity 220-a, the UE 115-a may move the uplink transmission 215-a to a different RF chain and proceed with both the idle mode activity 220-a on the RF chain 1 and the uplink transmission 215-b on the RF chain 2. The RF chain 2 may be unused during the tuneaway occasion 225-a and may refrain from interfering with the uplink transmission 215-b. In some cases, the UE 115-a may switch the uplink transmission 215-a to the RF chain 3 or the RF chain 4 depending on the availability of the RF chains. Based on the switching, the UE 115-a may transmit the uplink transmission 215-a using the RF chain 2, and the UE 115-a may continue to use the RF chain 1 for the idle mode activity 220-a associated with the nDDS. In some examples, the conflict may occur on two RF chains, and accordingly the UE 115-a may switch an affected uplink transmission from the two RF chains (e.g., the RF chain 1 and the RF chain 2) to two different RF chains (e.g., the RF chain 3 and the RF chain 4).

In some cases, the UE 115-a may transmit a scheduling request for the DDS, and the base station 105-a may transmit an uplink grant scheduling the uplink transmission 215-a based on the scheduling request. The UE 115-a may identify the conflict based on the uplink grant, and proceed with the tuneaway procedure as described herein. In some examples, the UE 115-a may use a tuneaway occasion 225-b (e.g., a second tuneaway occasion) to perform uplink transmissions 215, idle mode activities 220, or a combination thereof. For example, the nDDS may perform an idle mode activity 220-b on the RF chain 1 during the tuneaway occasion 225-b. If the RF chain 1 lacks any uplink transmissions 215, the UE 115-a may proceed with the idle mode activity 220-b without tuning away to a different RF chain.

Figure 3:
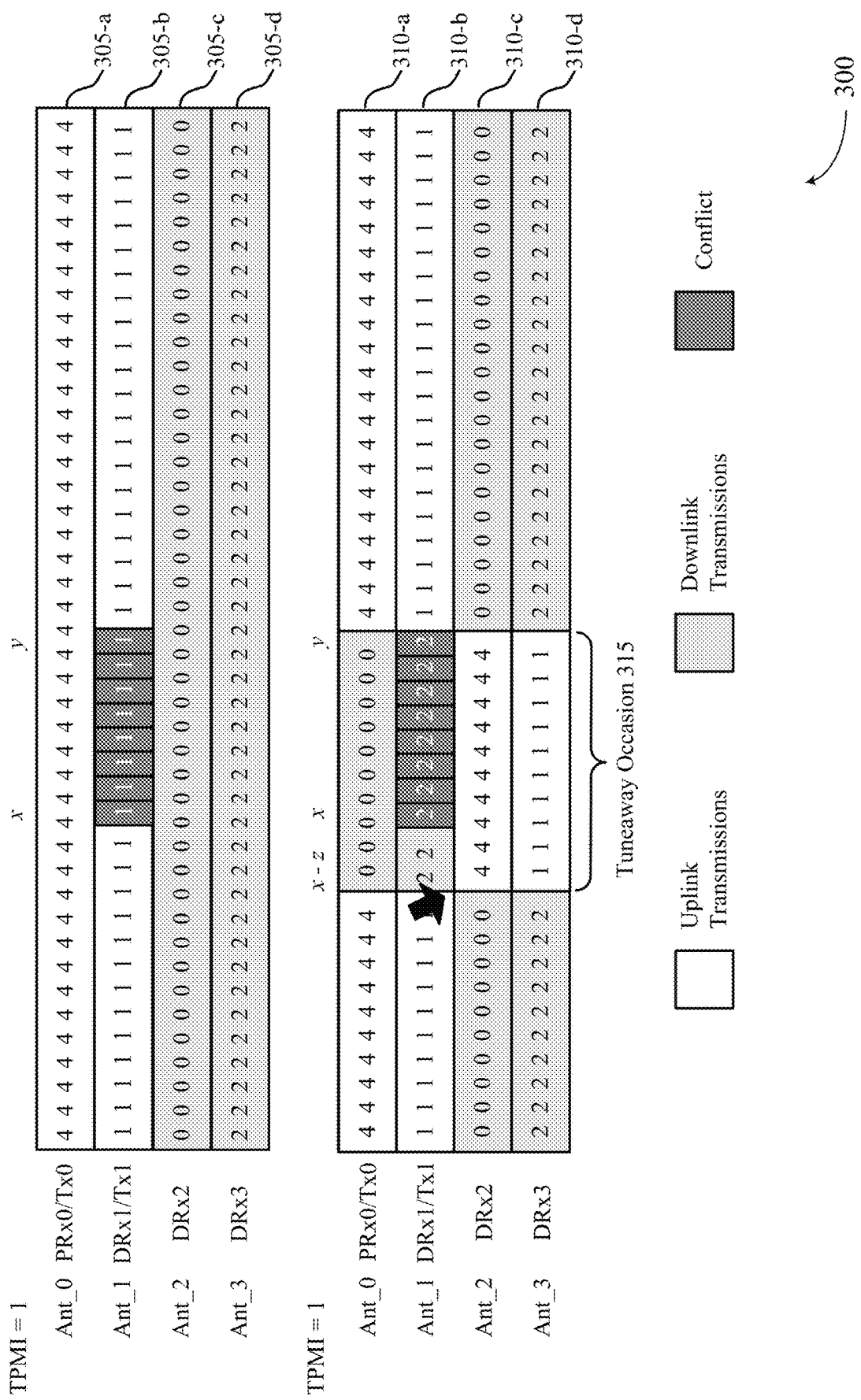
FIG. 3 illustrates an example of a tuneaway scheme that supports intelligent transmission selection for enhancing uplink performance in accordance with aspects of the present disclosure.

FIG. 3 illustrates an example of a tuneaway scheme 300 that supports intelligent transmission selection for enhancing uplink performance in accordance with aspects of the present disclosure. In some examples, the tuneaway scheme 300 may implement aspects of the wireless communications systems 100 and 200 or may be implemented by aspects of the wireless communications systems 100 and 200.

A UE (e.g., an MSIM UE) may support multiple subscriptions, such as a DDS and an nDDS. If a conflict occurs between by a DDS (e.g., a first subscription) performing uplink MIMO communications and an nDDS (e.g., a second subscription) performing idle mode activities on an RF chain, the UE may switch an uplink transmission path of the DDS from one or more first RF chains (e.g., and one or more corresponding antenna ports) to one or more different, available RF chains (e.g., and one or more available corresponding antenna ports) instead of dropping the uplink transmission. By switching the uplink transmission path, the UE may avoid the conflict (e.g., a tuneaway gap) and a subsequent outage on the first RF chain, and the UE may continue to use both the first RF chain for idle mode activities and the different RF chain for the uplink transmission.

The UE may have four antenna ports 305, including an antenna port 305-a (e.g., Ant_0), an antenna port 305-b (e.g., Ant_1), an antenna port 305-c (e.g., Ant_2), and an antenna port 305-*d* (e.g., Ant_3). Each antenna port 305 may correspond to an RF chain that the DDS may use for uplink transmissions and the nDDS may use for idle mode activities. That is, the RF chain may include an antenna port 305, a signal component, or another component. The UE may use the antenna port 305-*a* for uplink transmissions (e.g., corresponding to an RF chain Tx0, "4"), the antenna port 305-*b* for uplink transmissions (e.g., corresponding to an RF chain Tx1, "1"), the antenna port 305-*c* for downlink transmissions (e.g., corresponding to an RF chain DRx2, "0"), and the antenna port 305-*d* for downlink transmissions (e.g., corresponding to an RF chain DRx3, "2"). In some examples, the antenna port 305-*a* and the antenna port 305-*b* may additionally be used for downlink transmissions (e.g., RF chain PRx0 and RF chain DRx1, respectively). In some examples, a reference signal received power (RSRP) of the RF chains may be within +/−3 dBm or +/−5 dBm of one another, and as such uplink performance degradation may not result or may not sufficiently degrade performance when the UE performs switching from Ant_x to Ant_y upon detecting a conflict.

In the example of FIG. 3, the UE may be configured (e.g., by a base station) with TPMI=1, such that the UE may use an antenna port 305 corresponding to Tx1 for uplink transmission. The UE may also be configured such that uplink transmissions associated with the DDS may be precoded for transmission on a single spatial layer. For example, the UE may receive an uplink grant from the base station indicating that an uplink transmission may be precoded on a single spatial layer via two or more RF chains. That is, the UE may use the RF chain corresponding to Tx1 and the corresponding antenna port 305-*b* to perform uplink transmissions. However, because the RF chain may also be used for downlink transmissions (e.g., Tx1 and DRx1 may be coupled), the DDS may detect a conflict and upcoming tuneaway gap. For example, the nDDS may utilize a single RF chain during a tuneaway occasion, and the UE may identify the conflict for the uplink transmission based on the DDS and the nDDS both being configured to communicate using a first RF chain during the tuneaway occasion.

In some examples, the DDS may detect a conflict with an idle mode activity, such as a paging activity scheduled for the nDDS with a periodic paging cycle of 320 milliseconds (ms) or 640 ms. That is, between a time x and a time y (e.g., during the tuneaway occasion), the nDDS may request to use a first RF chain to perform the idle mode activity, and the DDS may detect a conflict between an uplink transmission associated with the DDS and an idle mode activity (e.g., a paging activity) associated with the nDDS on the first RF chain on the antenna port 305-*b*. In some examples, the base station may have already provided a grant to the nDDS for the idle mode activity on the RF chain (e.g., DRx1). While the DRx1 and the Tx1 chains may be coupled, the UE may be unable to use the RF chain for the uplink transmission and the idle mode activity simultaneously.

To avoid dropping the uplink transmission, the UE may switch the path of the uplink transmission to a different RF chain which may be available (e.g., unused) during a tuneaway occasion 315. For example, a conflict may occur during a time x and a time y (e.g., during the tuneaway occasion 315) between the uplink transmission associated with the DDS and the idle mode activity associated with the nDDS on an antenna port 310-*b*. As described herein, the antenna port 305-*a*, the antenna port 305-*b*, the antenna port 305-*c*, and the antenna port 305-*d* may correspond to an antenna port 310-*a*, the antenna port 310-*b*, an antenna port 310-*c*, and an antenna port 310-*d*, respectively. That is, the nDDS may request the RF chain on the antenna port 310-*b* to perform an idle mode activity, which may conflict with the uplink transmission of the DDS on the same RF chain.

At a time x-z prior to the tuneaway occasion 315, the UE may switch the uplink transmission associated with the DDS from a first RF chain on the antenna port 310-*a* to a different RF chain on a different antenna port 310 that may lack a conflicting idle mode activity associated with the nDDS. For example, at x-z, the UE may switch the Tx1 chain the antenna port 310-*b* (e.g., Ant_1) to the antenna port 310-*d* (e.g., Ant_3) and the DRx3 chain from the antenna port 310-*d* to the antenna port 310-*b*. Because the PRx0 and DRx1 chains (e.g., used for the idle mode activity) may be coupled, the UE may also switch the Tx0 chain from the antenna port 310-*a* (e.g., Ant_0) to the antenna port 310-*c* (e.g., Ant_2) and the DRx2 chain from the antenna port 310-*c* to the antenna port 310-*a*.

Based on switching the transmit and receive chains to available, different RF chains, the UE may perform the idle mode activity associated with the nDDS using the antenna port 310-*b* on the first RF chain and transmit the uplink transmission associated with the DDS using the antenna port 310-*d* on a different RF chain during the tuneaway occasion 315. In some examples, the UE may communicate a second uplink transmission associated with the DDS via the first RF chain (e.g., via Tx0 chain on the antenna port 310-*a* and via Tx1 chain on the antenna port 310-*b*) subsequent to the tuneaway occasion 315.

In some examples, when the DDS detects the conflict and initiates the switch so the UE may use the antenna port 310-*c* (e.g., Tx0) and the antenna port 310-*d* (e.g., Tx1) for uplink communications associated with the DDS during the tuneaway occasion 315, the UE may then use the antenna port 310-*a* (e.g., DRx3) and the antenna port 310-*b* (e.g., DRx2) for downlink communications associated with the DDS. As described herein, the nDDS may also use the antenna port 310-*b* to perform idle mode activities during the tuneaway occasion 315, and as such, the UE may lack the ability to use the RF chain on the antenna port 310-*b* for the downlink communications because the RF chain may be used by the nDDS. To prevent throughput loss in downlink communications, the UE may transmit a channel state feedback report to the base station at time x-z indicating support for a defined transmission rank during the tuneaway occasion 315. For example, the UE may indicate support for rank 3 and/or rank 2 communications, a lack of support for rank 4 communications, or both. Based on the channel state feedback report, the base station may transmit a downlink grant to the UE scheduling a downlink transmission during the tuneaway occasion 315 in accordance with the defined transmission rank.

In some cases, the UE may operate in uplink MIMO and may be configured with SMDL (e.g., TPMI=2), where the UE may perform uplink transmissions using either the antenna port 310-*a* or the antenna port 310-*b*, or both (e.g., the Tx0 chain, the Tx1 chain, or both). The UE may precode an uplink transmission, for example, for transmission via two (or more) RF chains and hence may use multiple antenna ports (e.g., antenna port 310-*a* and the antenna port 310-*b*). A conflict may occur between the DDS and the nDDS on the Tx0 chain, the Tx1 chain, or both, such as when two RF chains are to be used for idle mode activities. As such, the UE may switch the uplink transmissions from the antenna port 310-*a*, the antenna port 310-*b*, or both (e.g., based on whether the conflict occurred on the Tx0 chain, the Tx1 chain, or both) to the antenna port 310-*c*, the antenna port 310-*d*, or both so that the UE may continue to use two antenna ports 310 for uplink transmissions (e.g., based on the SMDL configuration).

Figure 4:
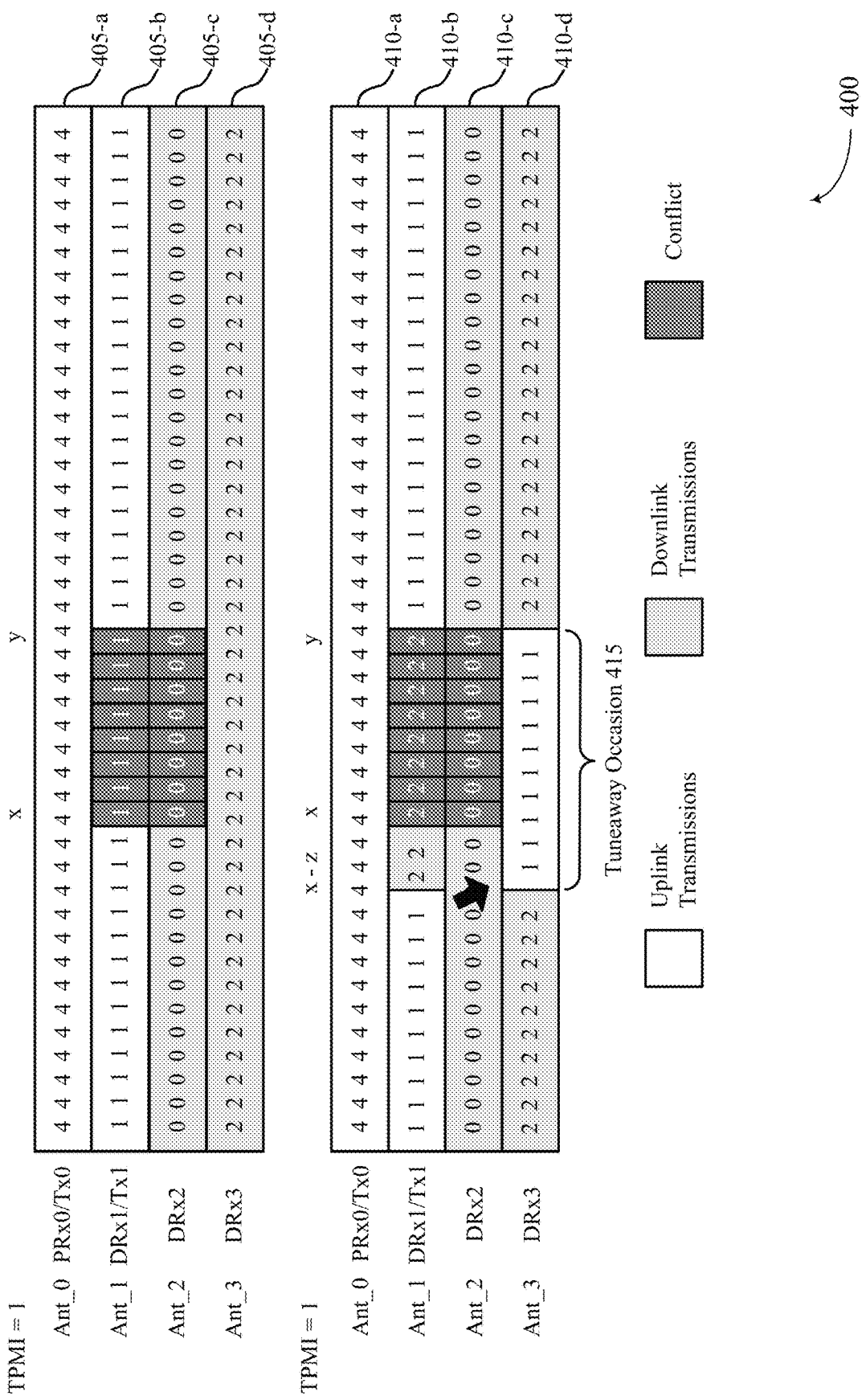
FIG. 4 illustrates an example of a tuneaway scheme that supports intelligent transmission selection for enhancing uplink performance in accordance with aspects of the present disclosure.

FIG. 4 illustrates an example of a tuneaway scheme 400 that supports intelligent transmission selection for enhancing uplink performance in accordance with aspects of the present disclosure. In some examples, the tuneaway scheme 400 may implement aspects of the wireless communications systems 100 and 200 or may be implemented by aspects of the wireless communications systems 100 and 200.

As described with reference to FIG. 3, the UE may have four antenna ports 405, including an antenna port 405-*a* (e.g., Ant_0), an antenna port 405-*b* (e.g., Ant_1), an antenna port 405-*c* (e.g., Ant_2), and an antenna port 405-*d* (e.g., Ant_3). Each antenna port 405 may correspond to an RF chain that the DDS may use for uplink transmissions and nDDS may use for idle mode activities. That is, the RF chain may include an antenna port 405, a signal component, or other components. The UE may use the antenna port 405-*a* for uplink transmissions (e.g., corresponding to an RF chain Tx0, "4"), the antenna port 405-*b* for uplink transmissions (e.g., corresponding to an RF chain Tx1, "1"), the antenna port 405-*c* for downlink transmissions (e.g., corresponding to an RF chain DRx2 "0"), and the antenna port 405-*d* for downlink transmissions (e.g., corresponding to an RF chain DRx3 "2"). In some examples, the antenna port 405-*a* and the antenna port 405-*b* may additionally be used for downlink transmissions (e.g., RF chain PRx0 and RF chain DRx1, respectively). In some examples, a reference signal received power (RSRP) of the RF chains may be within +/−3 dBm or +/−5 dBm of one another, and as such uplink performance degradation may not result or may not sufficiently degrade performance when the UE performs switching from Ant_x to Ant_y upon detecting a conflict.

In the example of FIG. 4, the UE may be configured (e.g., by a base station) with TPMI=1, such that the UE may use an antenna port 405 corresponding to Tx1 for uplink transmissions. The UE may also be configured such that uplink transmissions associated with the DDS may be precoded for transmission via two or more RF chains. For example, the UE may transmit a scheduling request associated with the DDS to the base station, and the base station may transmit an uplink grant to the UE indicating that an uplink transmission may be precoded for transmission via the two or more RF chains based on the scheduling request. That is, the UE may use two RF chains corresponding to the antenna port 405-*b* and the antenna port 405-*c*. However, the DDS may detect a conflict and upcoming tuneaway gap between the DDS and the nDDS on the RF chains. For example, the nDDS may utilize at least the two RF chains during a tuneaway occasion, and the UE may identify a conflict for the uplink transmission during the tuneaway occasion based on the DDS and the nDDS both being configured to communicate using one or more of the at least two RF chains during the tuneaway occasion. Between a time x and a time y (e.g., during the tuneaway occasion), the nDDS may request to use the two or more RF chains to perform the idle mode activity, and the DDS may detect a conflict between an uplink transmission associated with the DDS and an idle mode activity (e.g., a paging activity) associated with the nDDS on the two or more RF chains on the antenna port 405-*b* and the antenna port 405-*c*. In some examples, the base station may have already provided a grant to the nDDS for the idle mode activity on the two or more RF chains.

To avoid dropping the uplink transmission on the two or more RF chains, the UE may switch the path of the uplink transmission to two or more different RF chains which may be available (e.g., unused) during a tuneaway occasion 415. For example, a conflict may occur during a time x and a time y (e.g., during the tuneaway occasion 415) between the uplink transmission associated with the DDS and the idle mode activity associated with the nDDS on an antenna port 410-*b*. As described herein, the antenna port 405-*a*, the antenna port 405-*b*, the antenna port 405-*c*, and the antenna port 405-*d* may correspond to an antenna port 410-*a*, the antenna port 410-*b*, an antenna port 410-*c*, and an antenna port 410-*d*, respectively. The nDDS may request the two or more RF chains on the antenna port 410-*b* and the antenna port 410-*c* to perform an idle mode activity, which may conflict with the uplink transmission of the DDS on the RF chain on the antenna port 410-*b* (e.g., which may support uplink transmissions through the Tx1 RF chain).

At a time x-z prior to the tuneaway occasion 415, the UE may switch the uplink transmission associated with the DDS from the first RF chain on the antenna port 410-*b* to an available, different RF chain on a different antenna port 410 that may lack a conflicting nDDS idle mode activity. For example, at x-z, the UE may switch the Tx1 chain the antenna port 410-*b* (e.g., Ant_1) to an RF chain on the antenna port 410-*d* (e.g., Ant_3) and the DRx3 chain from the antenna port 410-*d* to the antenna port 410-*b*. Based on switching the transmit and receive chains to different RF chains, the UE may perform the idle mode activity associated with the nDDS using the antenna port 410-*b* and the antenna port 410-*c* on the two or more RF chains and transmit the uplink transmission associated with the DDS using the antenna port 410-*d* on a different RF chain during the tuneaway occasion 415. After the tuneaway occasion 415, the UE may switch back to performing uplink transmissions associated with the DDS using RF chains on the antenna port 410-*b*.

Figure 5:
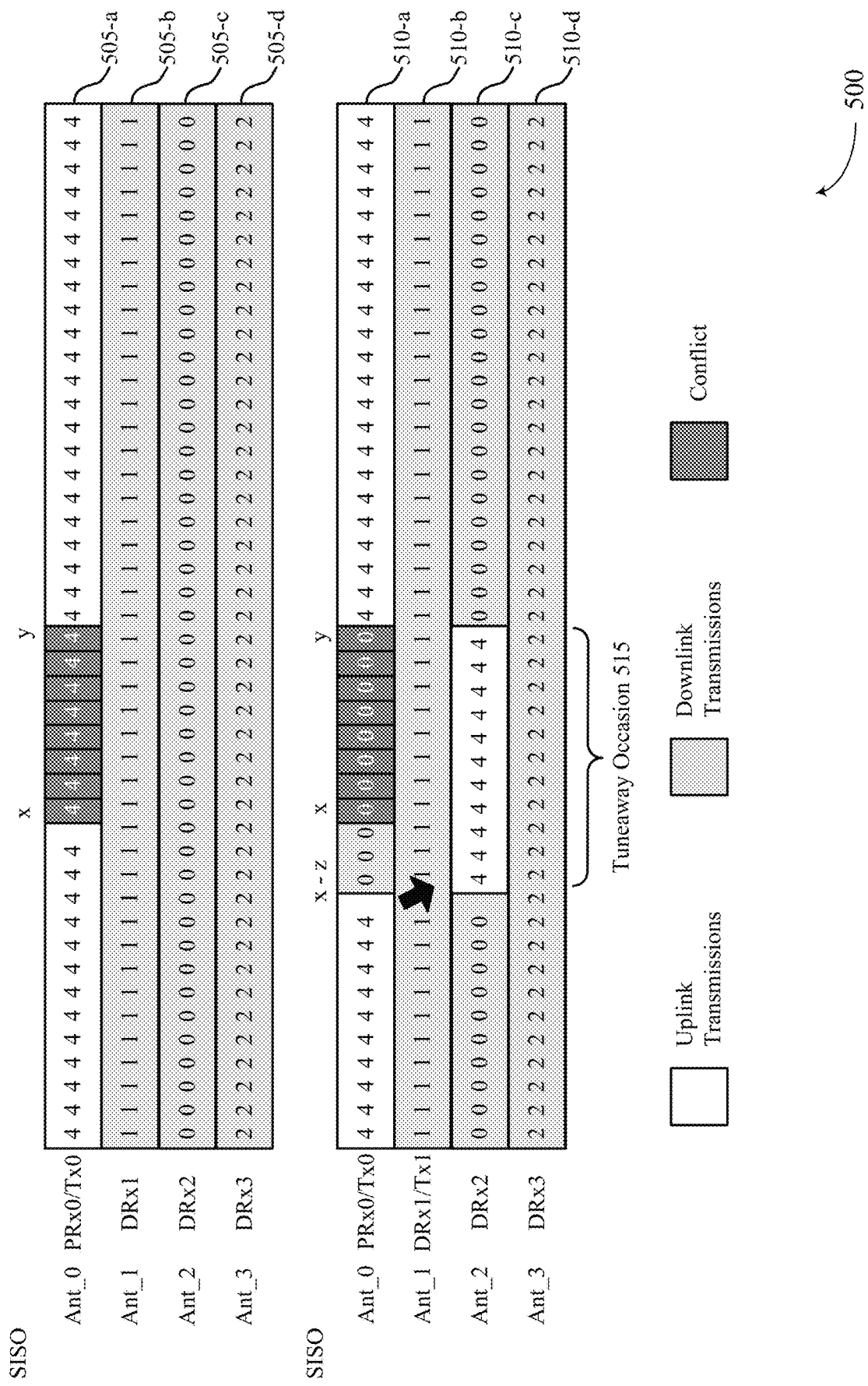
FIG. 5 illustrates an example of a tuneaway scheme that supports intelligent transmission selection for enhancing uplink performance in accordance with aspects of the present disclosure.

FIG. 5 illustrates an example of a tuneaway scheme 500 that supports intelligent transmission selection for enhancing uplink performance in accordance with aspects of the present disclosure. In some examples, the tuneaway scheme 500 may implement aspects of the wireless communications systems 100 and 200 or may be implemented by aspects of the wireless communications systems 100 and 200.

As described with reference to FIGS. 3 and 4, the UE may have four antenna ports 505, including an antenna port 505-*a* (e.g., Ant_0), an antenna port 505-*b* (e.g., Ant_1), an antenna port 505-*c* (e.g., Ant_2), and an antenna port 505-*d* (e.g., Ant_3). Each antenna port 505 may correspond to an RF chain that the DDS may use for uplink transmissions and the nDDS may use for idle mode activities. That is, the RF chain may include an antenna port 505, a signal component, or another component. The UE may use the antenna port 505-*a* for uplink transmissions (e.g., corresponding to an RF chain Tx0, "4"), the antenna port 505-*b* for downlink transmissions (e.g., corresponding to an RF chain DRx1, "1"), the antenna port 505-*c* for downlink transmissions (e.g., corresponding to an RF chain DRx2, "0"), and the antenna port 505-*d* for downlink transmissions (e.g., corresponding to an RF chain DRx3, "2"). In some examples, the antenna port 505-*a* may additionally be used for downlink transmissions (e.g., RF chain PRx0). In some examples, a reference signal received power (RSRP) of the RF chains may be within +/−3 dBm or +/−5 dBm of one another, and as such uplink performance degradation may not result or may not sufficiently degrade performance when the UE performs switching from Ant_x to Ant_y upon detecting a conflict.

In the example of FIG. 5, the UE may operate using single-input single-output (SISO) communications or spatial multiplexing single layer (SMSL) plus transmitted precoding matrix indicator (TPMI) is zero is active (SMSL+ TPMI=0), such that the UE may use an antenna port 505 corresponding to Tx0 for uplink transmissions. The UE may also be configured such that uplink transmissions associated with the DDS may be precoded for transmission via one RF chain. For example, the UE may transmit a scheduling request associated with the DDS to the base station, and the base station may transmit an uplink grant to the UE indicating that an uplink transmission may be precoded for transmission via one RF chain based on the scheduling request. That is, the UE may use the RF chain corresponding to the antenna port 505-*a* to perform the uplink transmissions.

The DDS may detect a conflict and upcoming tuneaway gap between the DDS and the nDDS on the RF chain. For example, the nDDS may utilize a single RF chain during a tuneaway occasion, where the uplink transmission may be a single layer transmission (e.g., via Tx0). The UE may identify the conflict for the uplink transmission in the tuneaway occasion based on the DDS and the nDDS both being configured to communicate using the first RF chain during the tuneaway occasion. Between a time x and a time y (e.g., during the tuneaway occasion), the nDDS may request to the first RF chain to perform the idle mode activity, and the DDS may detect the conflict between an uplink transmission associated with the DDS and the idle mode activity (e.g., a paging activity) associated with the nDDS on the first RF chain on the antenna port 505-*a*. In some examples, the base station may have already provided a grant to the nDDS for the idle mode activity on first RF chain.

To avoid dropping the uplink transmission on the first RF chain, the UE may switch the path of the uplink transmission to a different RF chain which may be available (e.g., unused) during a tuneaway occasion 515. For example, a conflict may occur during a time x and a time y (e.g., during the tuneaway occasion 515) between the uplink transmission associated with the DDS and the idle mode activity associated with the nDDS on an antenna port 510-*a*. As described herein, the antenna port 505-*a*, the antenna port 505-*b*, the antenna port 505-*c*, and the antenna port 505-*d* may correspond to an antenna port 510-*a*, the antenna port 510-*b*, an antenna port 510-*c*, and an antenna port 510-*d*, respectively. The nDDS may request the RF chain on the antenna port 510-*a* to perform an idle mode activity, which may conflict with the uplink transmission of the DDS on the RF chain on the antenna port 510-*a* (e.g., which may support uplink transmissions through the Tx0 RF chain).

At a time x-z prior to the tuneaway occasion 515, the UE may switch the uplink transmission associated with the DDS from the first RF chain on the antenna port 510-*a* to a different RF chain on a different antenna port 510 that may lack a conflicting nDDS idle mode activity. For example, at x-z, the UE may switch the Tx0 chain from the antenna port 510-*a* (e.g., Ant_1) to the antenna port 510-*c* (e.g., Ant_2) and the DRx2 chain from the antenna port 510-*c* to the antenna port 510-*a*. Additionally, the UE may maintain the PRx0 chain on the antenna port 510-*a* so that the UE may continue to perform other communication activities (e.g., downlink transmissions) on the antenna port 510-*a*. Based on switching the transmit and receive chains to a different RF chain, the UE may perform the idle mode activity associated with the nDDS using the antenna port 510-*a* on the first RF chain and transmit the uplink transmission associated with the DDS using the antenna port 510-*c* on a different RF chain during the tuneaway occasion 515. After the tuneaway occasion 515, the UE may switch back to performing uplink transmissions associated with the DDS using RF chains on the antenna port 510-*a*.

Figure 6:
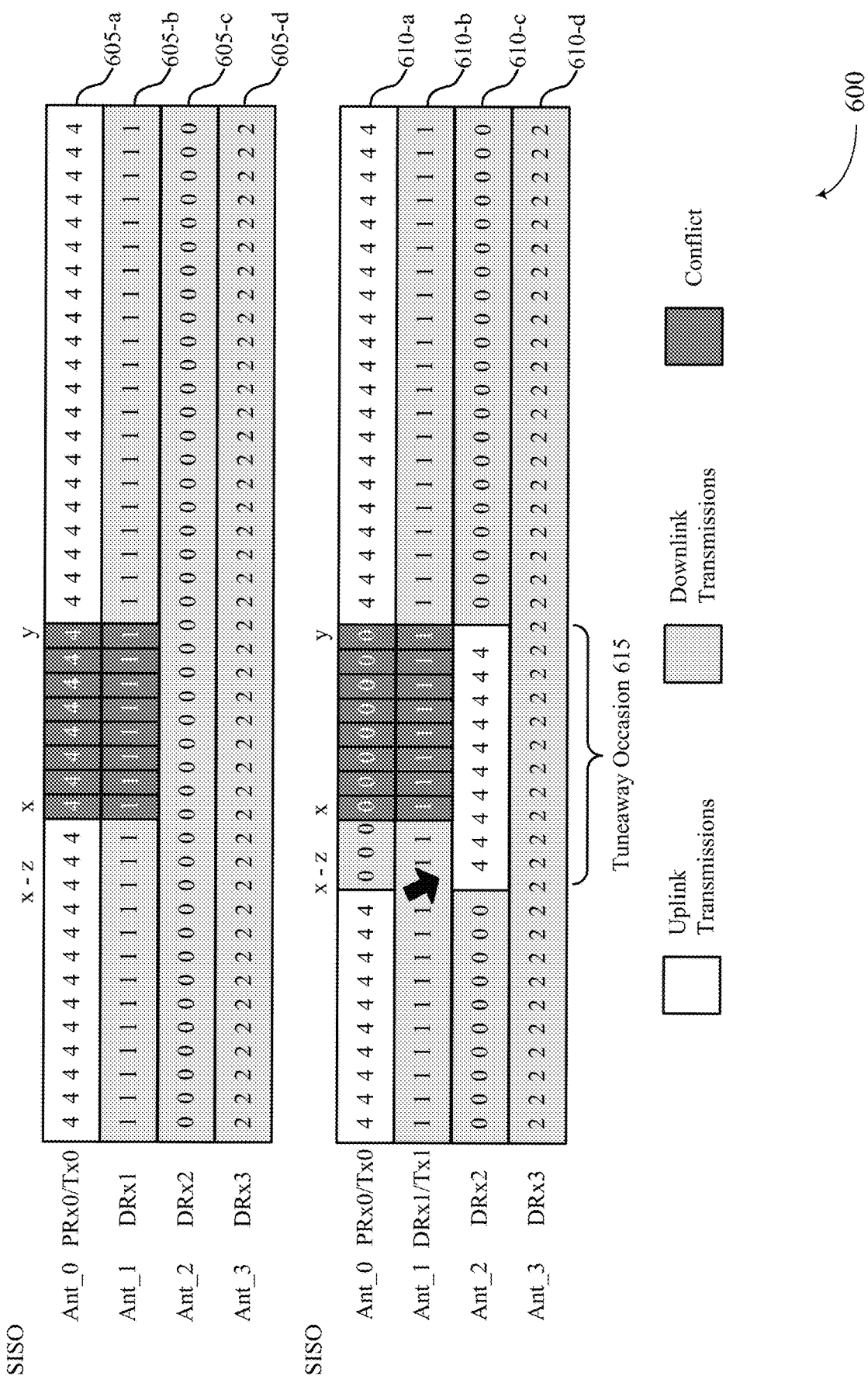
FIG. 6 illustrates an example of a tuneaway scheme that supports intelligent transmission selection for enhancing uplink performance in accordance with aspects of the present disclosure.

FIG. 6 illustrates an example of a tuneaway scheme 600 that supports intelligent transmission selection for enhancing uplink performance in accordance with aspects of the present disclosure. In some examples, the tuneaway scheme 600 may implement aspects of the wireless communications systems 100 and 200 or may be implemented by aspects of the wireless communications systems 100 and 200.

As described with reference to FIGS. 3-5, the UE may have four antenna ports 605, including an antenna port 605-*a* (e.g., Ant_0), an antenna port 605-*b* (e.g., Ant_1), an antenna port 605-*c* (e.g., Ant_2), and an antenna port 605-*d* (e.g., Ant_3). Each antenna port 605 may correspond to an RF chain that the DDS may use for uplink transmissions and the nDDS may use for idle mode activities. That is, the RF chain may include an antenna port 605, a signal component, or another component. The UE may use the antenna port 605-*a* for uplink transmissions (e.g., corresponding to an RF chain Tx0, "4"), the antenna port 605-*b* for downlink transmissions (e.g., corresponding to an RF chain DRx1, "1"), the antenna port 605-*c* for downlink transmissions (e.g., corresponding to an RF chain DRx2, "0"), and the antenna port 605-*d* for downlink transmissions (e.g., corresponding to an RF chain DRx3, "0"). In some examples, the antenna port 605-*a* may additionally be used for downlink transmissions (e.g., RF chain PRx0). In some examples, a reference signal received power (RSRP) of the RF chains may be within +/−3 dBm or +/−5 dBm of one another, and as such uplink performance degradation may not result or may not sufficiently degrade performance when the UE performs switching from Ant_x to Ant_y upon detecting a conflict.

In the example of FIG. 6, the UE may operate using SISO communications or spatial multiplexing single layer (SMSL) plus transmitted precoding matrix indicator (TPMI) is zero is active (SMSL+TPMI=0), such that the UE may use an antenna port 605 corresponding to Tx0 for uplink transmissions. The UE may also be configured such that uplink transmissions associated with the DDS may be precoded for transmission via two or more RF chains. For example, the UE may transmit a scheduling request associated with the DDS to the base station, and the base station may transmit an uplink grant to the UE indicating that an uplink transmission may be precoded for transmission via the two or more RF chains based on the scheduling request. That is, the UE may use the RF chain corresponding to the antenna port 605-*a* to perform the uplink transmissions.

The DDS may detect a conflict and upcoming tuneaway gap between the DDS and the nDDS on the RF chain. For example, the nDDS may utilize two or more RF chains during a tuneaway occasion, where the uplink transmission is a single layer transmission (e.g., via the Tx0 chain). The UE may identify the conflict for the uplink transmission in the tuneaway occasion based on the DDS and the nDDS both being configured to communicate using the two or more RF chains during the tuneaway occasion. Between a time x and a time y (e.g., during the tuneaway occasion), the nDDS may request to use the two or more RF chains to perform the idle mode activity, and the DDS may detect the conflict between an uplink transmission associated with the DDS and the idle mode activity (e.g., a paging activity) associated with the nDDS on the two or more RF chains on the antenna port 605-*a*. In some examples, the base station may have already provided a grant to the nDDS for the idle mode activity on the two or more RF chains.

To avoid dropping the uplink transmission on the two or more RF chains, the UE may switch the path of the uplink transmission to a different RF chain which may be available (e.g., unused) during a tuneaway occasion 615. For example, a conflict may occur during a time x and a time y (e.g., during the tuneaway occasion 615) between the uplink transmission associated with the DDS and the idle mode activity associated with the nDDS on an antenna port 610-*a*. As described herein, the antenna port 605-*a*, the antenna port 605-*b*, an antenna port 605-*c*, and an antenna port 605-*d* may correspond to an antenna port 610-*a*, the antenna port 610-*b*, the antenna port 610-*c*, and the antenna port 610-*d*, respectively. The nDDS may request the two or more RF chains on the antenna port 610-*a* and the antenna port 605-*b* to perform an idle mode activity, which may conflict with the uplink transmission of the DDS on the RF chain on the antenna port 610-*a* (e.g., which may support uplink transmissions through the Tx0 chain).

At a time x-z prior to the tuneaway occasion 615, the UE may switch the uplink transmission associated with the DDS from the two or more RF chains on the antenna port 610-*a* to a different RF chain on a different antenna port 610 that may lack a conflicting nDDS idle mode activity. For example, at x-z, the UE may switch the Tx0 chain from the antenna port 610-*a* (e.g., Ant_1) to the antenna port 610-*c* (e.g., Ant_2) and the DRx2 chain from the antenna port 610-*c* to the antenna port 610-*a*. The UE may refrain from switching the RF chain on the antenna port 610-*b* the antenna port 610-*b* may not effect uplink transmissions. Based on switching the transmit and receive chains to a different RF chain, the UE may perform the idle mode activity associated with the nDDS using the antenna port 610-*a* on the two or more RF chains and transmit the uplink transmission associated with the DDS using the antenna port 610-*c* on a different RF chain during the tuneaway occasion 615. After the tuneaway occasion 615, the UE may switch back to performing uplink transmissions associated with the DDS using RF chains on the antenna port 610-*a*. It is noted that the roles of nDDS and DDS described in FIGS. 3-6 may be reversed.

Figure 7:
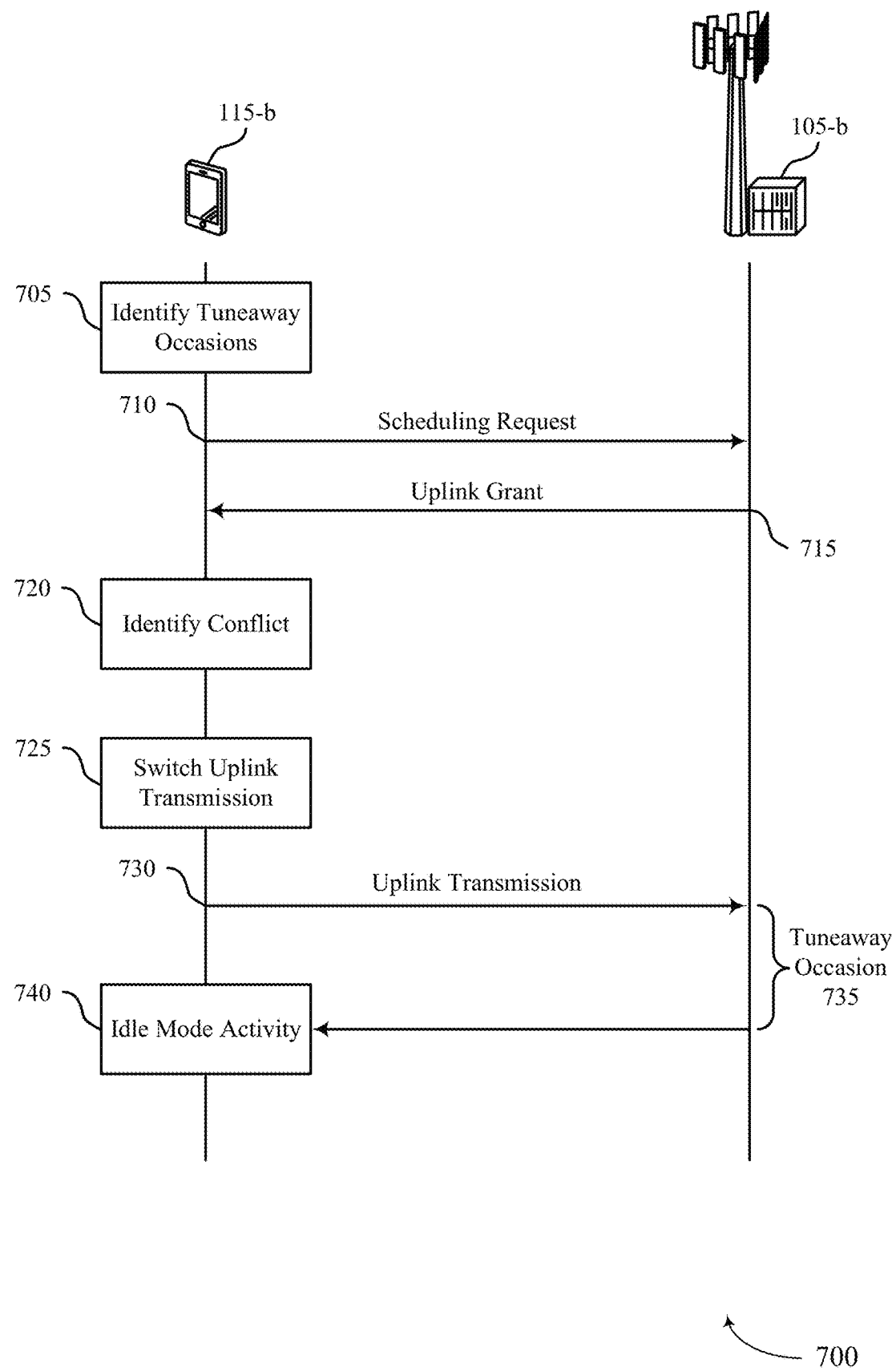
FIG. 7 illustrates an example of a process flow that supports intelligent transmission selection for enhancing uplink performance in accordance with aspects of the present disclosure.

FIG. 7 illustrates an example of a process flow 700 that supports intelligent transmission selection for enhancing uplink performance in accordance with aspects of the present disclosure. The process flow 700 may implement aspects of wireless communications systems 100 and 200, or may be implemented by aspects of the wireless communications system 100 and 200. For example, the process flow 700 may illustrate operations between a UE 115-*b* and a base station 105-*b*, which may be examples of corresponding devices described herein. In the following description of the process flow 700, the operations between the UE 115-*b* and the base station 105-*b* may be transmitted in a different order than the example order shown, or the operations performed by the UE 115-*b* and the base station 105-*b* may be performed in different orders or at different times. Some operations may also be omitted from the process flow 700, and other operations may be added to the process flow 700.

At 705, the UE 115-*b* may identify multiple tuneaway occasions in which the UE 115-*b* may tune away at least one RF chain of multiple RF chain from a first subscription and a second subscription. The first subscription may be a DDS and the second subscription may be an nDDS, or the first subscription may be the nDDS and the second subscription may be the DDS. In some examples, each of the multiple tuneaway occasions may correspond to an idle mode activity associated with the nDDS, such as page decoding, a cell search, a measurement, or any combination thereof. In some examples, the second subscription is to utilize a single RF chain during the first tuneaway occasion, or the second subscription is to utilize at least two RF chains of the multiple RF chains during the first tuneaway occasion.

At 710, the UE 115-*b* may transmit, to the base station 105-*b*, a scheduling request associated with the first subscription. In some examples, the UE 115-*b* may transmit a channel state feedback report indicating support for a defined transmission rank during the first tuneaway occasion, and the UE 115-*b* may receive a downlink grant from the base station 105-*b* scheduling a downlink transmission during the first tuneaway occasion in accordance with the defined transmission rank.

At 715, the UE 115-*b* may receive, from the base station 105-*b*, an uplink grant scheduling an uplink transmission based on the scheduling request. In some examples, the uplink transmission may be a single layer transmission or a multiple layer transmission (e.g., SMDL). In some cases, the UE 115-*b* may receive an uplink grant indicating that the uplink transmission is to be precoded for transmission on a single spatial layer (e.g., TPMI=1) via two or more of the multiple RF chains, or indicating that the uplink transmission is to be precoded for transmission via one RF chain or via two or more RF chains of the multiple RF chains based on the scheduling request.

At 720, the UE 115-*b* may identify a conflict for the uplink transmission associated with the first subscription during a first tuneaway occasion of the multiple tuneaway occasions. For example, the conflict may occur between the RF chains used by the DDS and the nDDS. In some examples, the UE 115-*b* may identify the conflict for the uplink transmission based on the uplink grant. Additionally or alternatively, the UE 115-*b* may identify the conflict for the uplink transmission based on the first subscription and the second subscription both being configured to communicate using the first RF chain during the first tuneaway occasion, or based on the first subscription and the second subscription both being configured to communicate using one or more of the at least two RF chains during the first tuneaway occasion.

At 725, the UE 115-*b* may switch the uplink transmission from one or more first RF chains to one or more available second RF chains of the multiple RF chains based on the conflict. For example, the UE 115-*b* may switch the uplink transmission to the one or more available second RF chains, which may lack a conflict for the uplink transmission with an idle mode activity associated with the nDDS.

At 730, during a tuneaway occasion 735 (e.g., the first tuneaway occasion), the UE 115-*b* may transmit the uplink transmission using the one or more available second RF chains based on the switching. At 740, during the tuneaway occasion 735, the UE 115-*b* may participate in an idle mode activity with the base station on the one or more first RF chains. As such, the UE 115-*b* may use the one or more first RF chains and the one or more available second RF chains during the tuneaway occasion 735. In some cases, the UE 115-*b* may communicate a second uplink transmission of the first subscription via the first one or more RF chains subsequent to the first tuneaway occasion.

Figure 8:
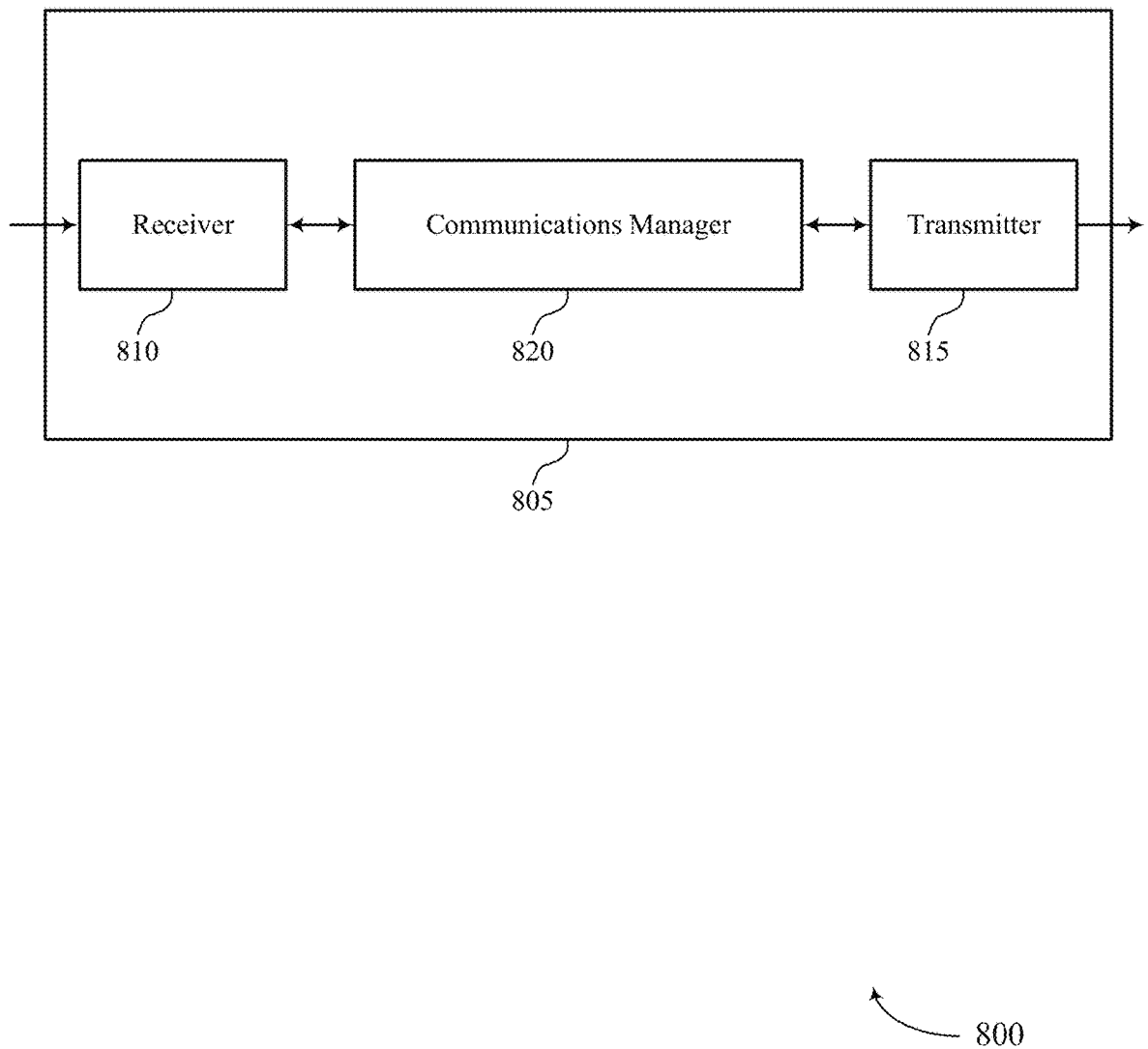
FIGS. 8 and 9 show block diagrams of devices that support intelligent transmission selection for enhancing uplink performance in accordance with aspects of the present disclosure.

FIG. 8 shows a block diagram 800 of a device 805 that supports intelligent transmission selection for enhancing uplink performance in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to intelligent transmission selection for enhancing uplink performance). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to intelligent transmission selection for enhancing uplink performance). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of intelligent transmission selection for enhancing uplink performance as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

For example, the communications manager 820 may be configured as or otherwise support a means for identifying a set of multiple tuneaway occasions in which the UE is to tune away at least one RF chain of a set of multiple RF chains from a first subscription to a second subscription. The communications manager 820 may be configured as or otherwise support a means for identifying a conflict for an uplink transmission associated with the first subscription during a first tuneaway occasion of the set of multiple tuneaway occasions. The communications manager 820 may be configured as or otherwise support a means for switching the uplink transmission from one or more first RF chains to one or more available second RF chains of the set of multiple RF chains based on the conflict. The communications manager 820 may be configured as or otherwise support a means for transmitting the uplink transmission using the one or more available second RF chains based on the switching.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for intelligent transmission selection, which may enable the device 805 to use multiple RF chains for uplink transmissions and idle mode activities. Further, the described techniques may improve uplink throughput performance during tuneaway occasions and improve user experience.

Figure 9:
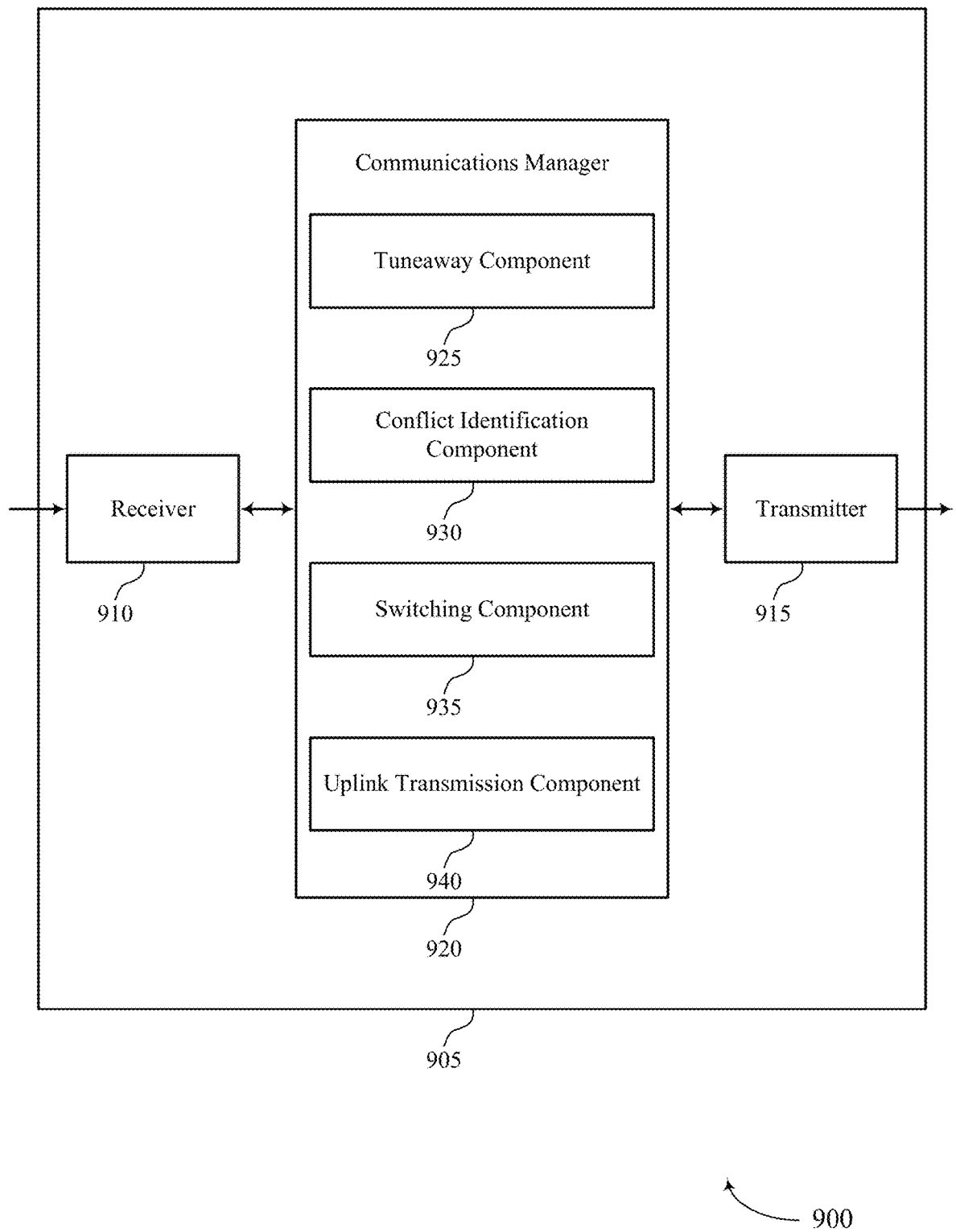

FIG. 9 shows a block diagram 900 of a device 905 that supports intelligent transmission selection for enhancing uplink performance in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to intelligent transmission selection for enhancing uplink performance). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to intelligent transmission selection for enhancing uplink performance). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of intelligent transmission selection for enhancing uplink performance as described herein. For example, the communications manager 920 may include a tuneaway component 925, a conflict identification component 930, a switching component 935, an uplink transmission component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The tuneaway component 925 may be configured as or otherwise support a means for identifying a set of multiple tuneaway occasions in which the UE is to tune away at least one RF chain of a set of multiple RF chains from a first subscription to a second subscription. The conflict identification component 930 may be configured as or otherwise support a means for identifying a conflict for an uplink transmission associated with the first subscription during a first tuneaway occasion of the set of multiple tuneaway occasions. The switching component 935 may be configured as or otherwise support a means for switching the uplink transmission from one or more first RF chains to one or more available second RF chains of the set of multiple RF chains based on the conflict. The uplink transmission component 940 may be configured as or otherwise support a means for transmitting the uplink transmission using the one or more available second RF chains based on the switching.

Figure 10:
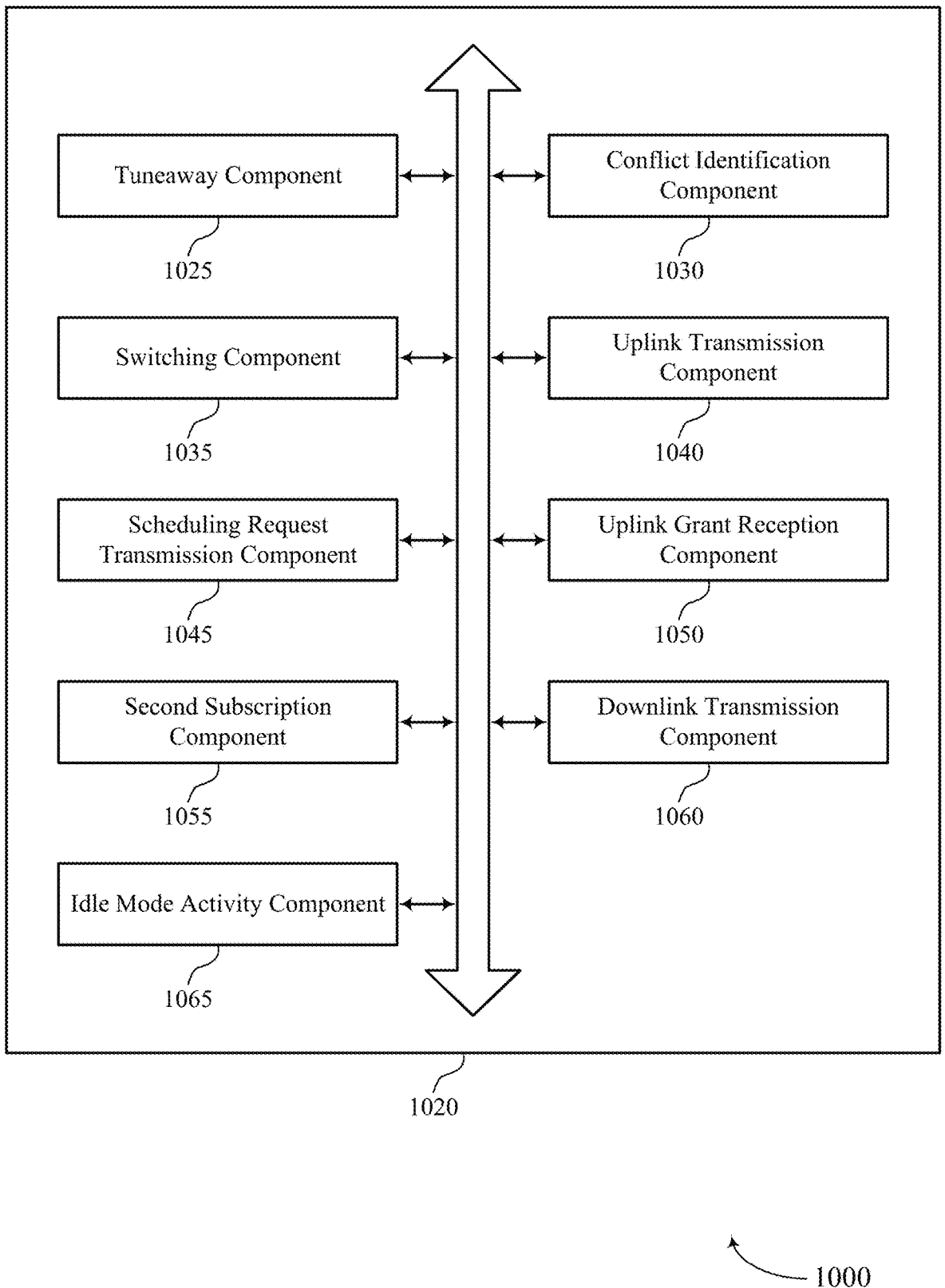
FIG. 10 shows a block diagram of a communications manager that supports intelligent transmission selection for enhancing uplink performance in accordance with aspects of the present disclosure.

FIG. 10 shows a block diagram 1000 of a communications manager 1020 that supports intelligent transmission selection for enhancing uplink performance in accordance with aspects of the present disclosure. The communications manager 1020 may be an example of aspects of a communications manager 820, a communications manager 920, or both, as described herein. The communications manager 1020, or various components thereof, may be an example of means for performing various aspects of intelligent transmission selection for enhancing uplink performance as described herein. For example, the communications manager 1020 may include a tuneaway component 1025, a conflict identification component 1030, a switching component 1035, an uplink transmission component 1040, a scheduling request transmission component 1045, an uplink grant reception component 1050, a second subscription component 1055, a downlink transmission component 1060, an idle mode activity component 1065, or any combination thereof. Each of these components may communicate, directly or indirectly, with one another (e.g., via one or more buses).

The tuneaway component 1025 may be configured as or otherwise support a means for identifying a set of multiple tuneaway occasions in which the UE is to tune away at least one RF chain of a set of multiple RF chains from a first subscription to a second subscription. The conflict identification component 1030 may be configured as or otherwise support a means for identifying a conflict for an uplink transmission associated with the first subscription during a first tuneaway occasion of the set of multiple tuneaway occasions. The switching component 1035 may be configured as or otherwise support a means for switching the uplink transmission from one or more first RF chains to one or more available second RF chains of the set of multiple RF chains based on the conflict. The uplink transmission component 1040 may be configured as or otherwise support a means for transmitting the uplink transmission using the one or more available second RF chains based on the switching.

In some examples, the scheduling request transmission component 1045 may be configured as or otherwise support a means for transmitting a scheduling request associated with the first subscription. In some examples, the uplink grant reception component 1050 may be configured as or otherwise support a means for receiving an uplink grant scheduling the uplink transmission based on the scheduling request. In some examples, the conflict identification component 1030 may be configured as or otherwise support a means for identifying the conflict for the uplink transmission during the first tuneaway occasion based on the uplink grant.

In some examples, the second subscription component 1055 may be configured as or otherwise support a means for identifying that the second subscription is to utilize a single RF chain during the first tuneaway occasion. In some examples, the conflict identification component 1030 may be configured as or otherwise support a means for identifying the conflict for the uplink transmission based on the first subscription and the second subscription both being configured to communicate using a first RF chain during the first tuneaway occasion.

In some examples, the uplink grant reception component 1050 may be configured as or otherwise support a means for receiving an uplink grant indicating that the uplink transmission is to be precoded for transmission on a single spatial layer via two or more of the set of multiple RF chains, where the conflict is identified based on the uplink grant.

In some examples, the second subscription component 1055 may be configured as or otherwise support a means for identifying that the second subscription is to utilize at least two RF chains of the set of multiple RF chains during the first tuneaway occasion. In some examples, the conflict identification component 1030 may be configured as or otherwise support a means for identifying the conflict for the uplink transmission during the first tuneaway occasion based on the first subscription and the second subscription both being configured to communicate using one or more of the at least two RF chains during the first tuneaway occasion.

In some examples, the uplink grant reception component 1050 may be configured as or otherwise support a means for receiving an uplink grant indicating that the uplink transmission is to be precoded for transmission via two or more RF chains of the set of multiple RF chains based on a scheduling request.

In some examples, the second subscription component 1055 may be configured as or otherwise support a means for identifying that the second subscription is to utilize a single RF chain of the set of multiple RF chains during the first tuneaway occasion, where the uplink transmission is a single layer transmission. In some examples, the conflict identification component 1030 may be configured as or otherwise support a means for identifying the conflict for the uplink transmission during the first tuneaway occasion based on the first subscription and the second subscription both being configured to communicate using a first RF chain during the first tuneaway occasion.

In some examples, the uplink grant reception component 1050 may be configured as or otherwise support a means for receiving an uplink grant indicating that the uplink transmission is to be precoded for transmission via one RF chain of the set of multiple RF chains based on a scheduling request, where the conflict is identified based on the uplink grant.

In some examples, the second subscription component 1055 may be configured as or otherwise support a means for identifying that the second subscription is to utilize at least two RF chains of the set of multiple RF chains during the first tuneaway occasion, where the uplink transmission is a single layer transmission. In some examples, the conflict identification component 1030 may be configured as or otherwise support a means for identifying the conflict for the uplink transmission during the first tuneaway occasion based on the first subscription and the second subscription both being configured to communicate using one or more of the at least two RF chains during the first tuneaway occasion.

In some examples, the uplink grant reception component 1050 may be configured as or otherwise support a means for receiving an uplink grant indicating that the uplink transmission is to be precoded for transmission via two or more RF chains of the set of multiple RF chains based on a scheduling request, where the conflict is identified based on the uplink grant.

In some examples, the second subscription component 1055 may be configured as or otherwise support a means for identifying that the second subscription is to utilize at least two RF chains of the set of multiple RF chains during the first tuneaway occasion, where the uplink transmission is a multiple layer transmission. In some examples, the conflict identification component 1030 may be configured as or otherwise support a means for identifying the conflict for the uplink transmission during the first tuneaway occasion based on the first subscription and the second subscription both being configured to communicate using one or more of the at least two RF chains during the first tuneaway occasion.

In some examples, the uplink grant reception component 1050 may be configured as or otherwise support a means for receiving an uplink grant indicating that the uplink transmission is to be precoded for transmission via two or more RF chains of the set of multiple RF chains based on a scheduling request, where the conflict is identified based on the uplink grant.

In some examples, the downlink transmission component 1060 may be configured as or otherwise support a means for transmitting a channel state feedback report indicating support for a defined transmission rank during the first tuneaway occasion. In some examples, the downlink transmission component 1060 may be configured as or otherwise support a means for receiving a downlink grant scheduling a downlink transmission during the first tuneaway occasion in accordance with the defined transmission rank.

In some examples, the uplink transmission component 1040 may be configured as or otherwise support a means for communicating a second uplink transmission of the first subscription via the first RF chains subsequent to the first tuneaway occasion.

In some examples, the first subscription is a DDS and the second subscription is an nDDS or where the first subscription is the nDDS and the second subscription is the DDS.

In some examples, each of the set of multiple tuneaway occasions correspond to an idle mode activity associated with the second subscription that is a nDDS. In some examples, the idle mode activity includes page decoding, a cell search, a measurement, or any combination thereof.

Figure 11:
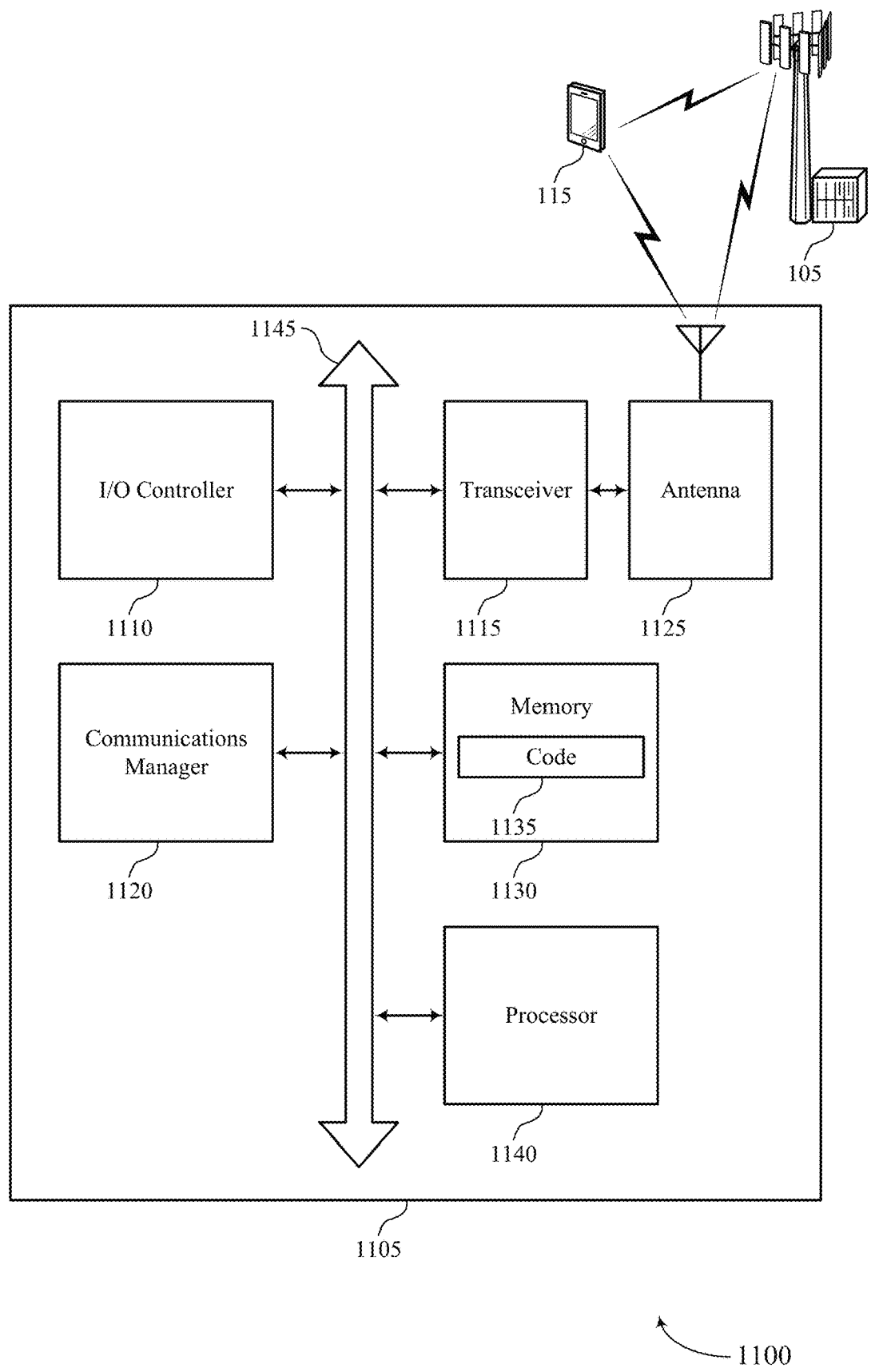
FIG. 11 shows a diagram of a system including a device that supports intelligent transmission selection for enhancing uplink performance in accordance with aspects of the present disclosure.

FIG. 11 shows a diagram of a system 1100 including a device 1105 that supports intelligent transmission selection for enhancing uplink performance in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting intelligent transmission selection for enhancing uplink performance). For example, the device 1105 or a component of the device 1105 may include a processor 1140 and memory 1130 coupled to the processor 1140, the processor 1140 and memory 1130 configured to perform various functions described herein.

For example, the communications manager 1120 may be configured as or otherwise support a means for identifying a set of multiple tuneaway occasions in which the UE is to tune away at least one RF chain of a set of multiple RF chains from a first subscription to a second subscription. The communications manager 1120 may be configured as or otherwise support a means for identifying a conflict for an uplink transmission associated with the first subscription during a first tuneaway occasion of the set of multiple tuneaway occasions. The communications manager 1120 may be configured as or otherwise support a means for switching the uplink transmission from one or more first RF chains to one or more available second RF chains of the set of multiple RF chains based on the conflict. The communications manager 1120 may be configured as or otherwise support a means for transmitting the uplink transmission using the one or more available second RF chains based on the switching.

By including or configuring the communications manager 1120 in accordance with examples as described herein, the device 1105 may support techniques for intelligent transmission selection, which may enable the device 1105 to use multiple RF chains for uplink transmissions and idle mode activities. Further, the described techniques may improve uplink throughput performance during tuneaway occasions and improve user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of intelligent transmission selection for enhancing uplink performance as described herein, or the processor 1140 and the memory 1130 may be otherwise configured to perform or support such operations.

Figure 12:
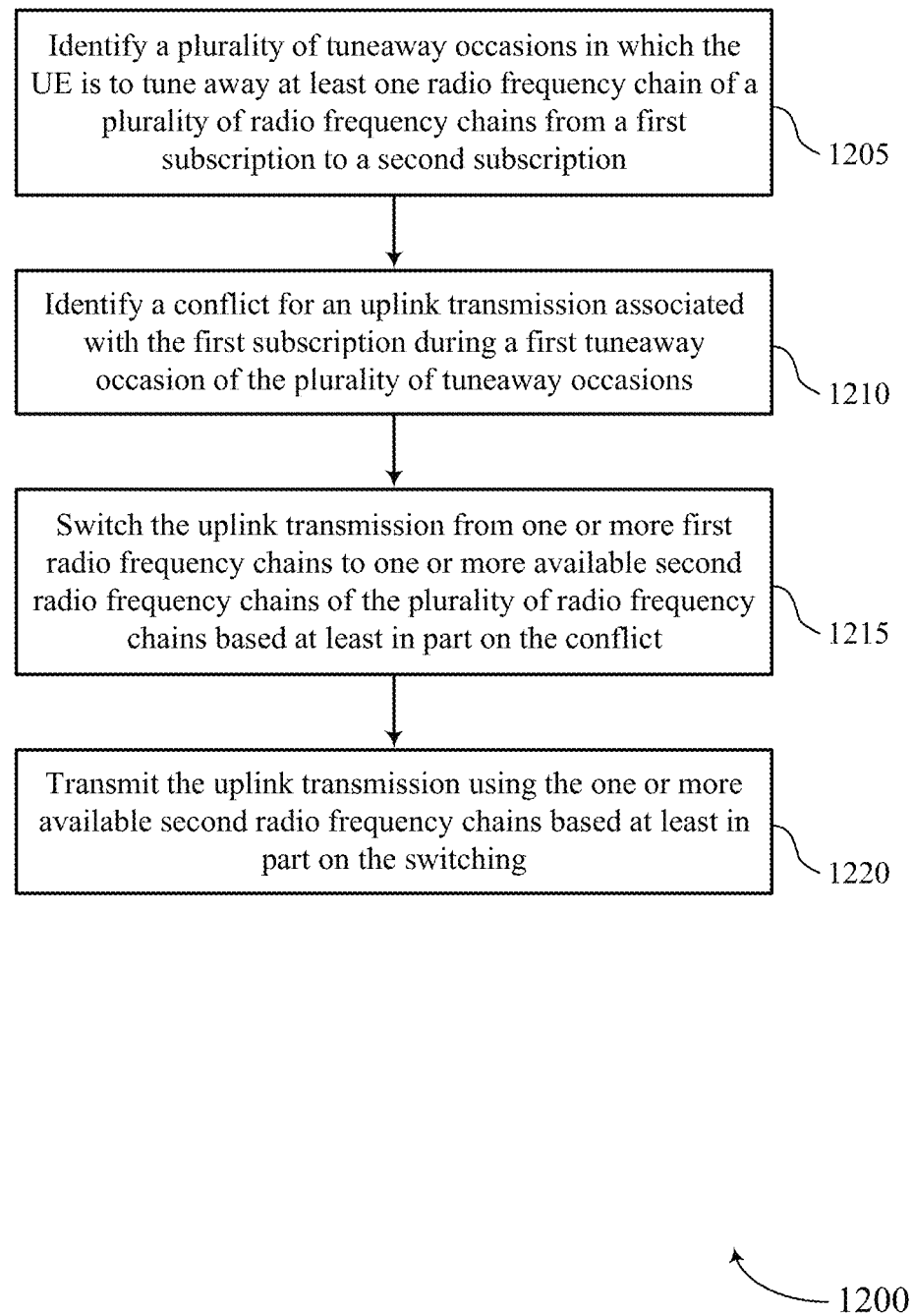
FIGS. 12 through 14 show flowcharts illustrating methods that support intelligent transmission selection for enhancing uplink performance in accordance with aspects of the present disclosure.

FIG. 12 shows a flowchart illustrating a method 1200 that supports intelligent transmission selection for enhancing uplink performance in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include identifying a set of multiple tuneaway occasions in which the UE is to tune away at least one RF chain of a set of multiple RF chains from a first subscription to a second subscription. The operations of 1205 may be performed in accordance with examples as disclosed herein. In some examples, aspects of the operations of 1205 may be performed by a tuneaway component 1025 as described with reference to FIG. 10.

At 1210, the method may include identifying a conflict for an uplink transmission associated with the first subscription during a first tuneaway occasion of the set of multiple tuneaway occasions. The operations of 1210 may be performed in accordance with examples as disclosed herein. In some examples, aspects of the operations of 1210 may be performed by a conflict identification component 1030 as described with reference to FIG. 10.

At 1215, the method may include switching the uplink transmission from one or more first RF chains to one or more available second RF chains of the set of multiple RF chains based on the conflict. The operations of 1215 may be performed in accordance with examples as disclosed herein. In some examples, aspects of the operations of 1215 may be performed by a switching component 1035 as described with reference to FIG. 10.

At 1220, the method may include transmitting the uplink transmission using the one or more available second RF chains based on the switching. The operations of 1220 may be performed in accordance with examples as disclosed herein. In some examples, aspects of the operations of 1220 may be performed by an uplink transmission component 1040 as described with reference to FIG. 10.

Figure 13:
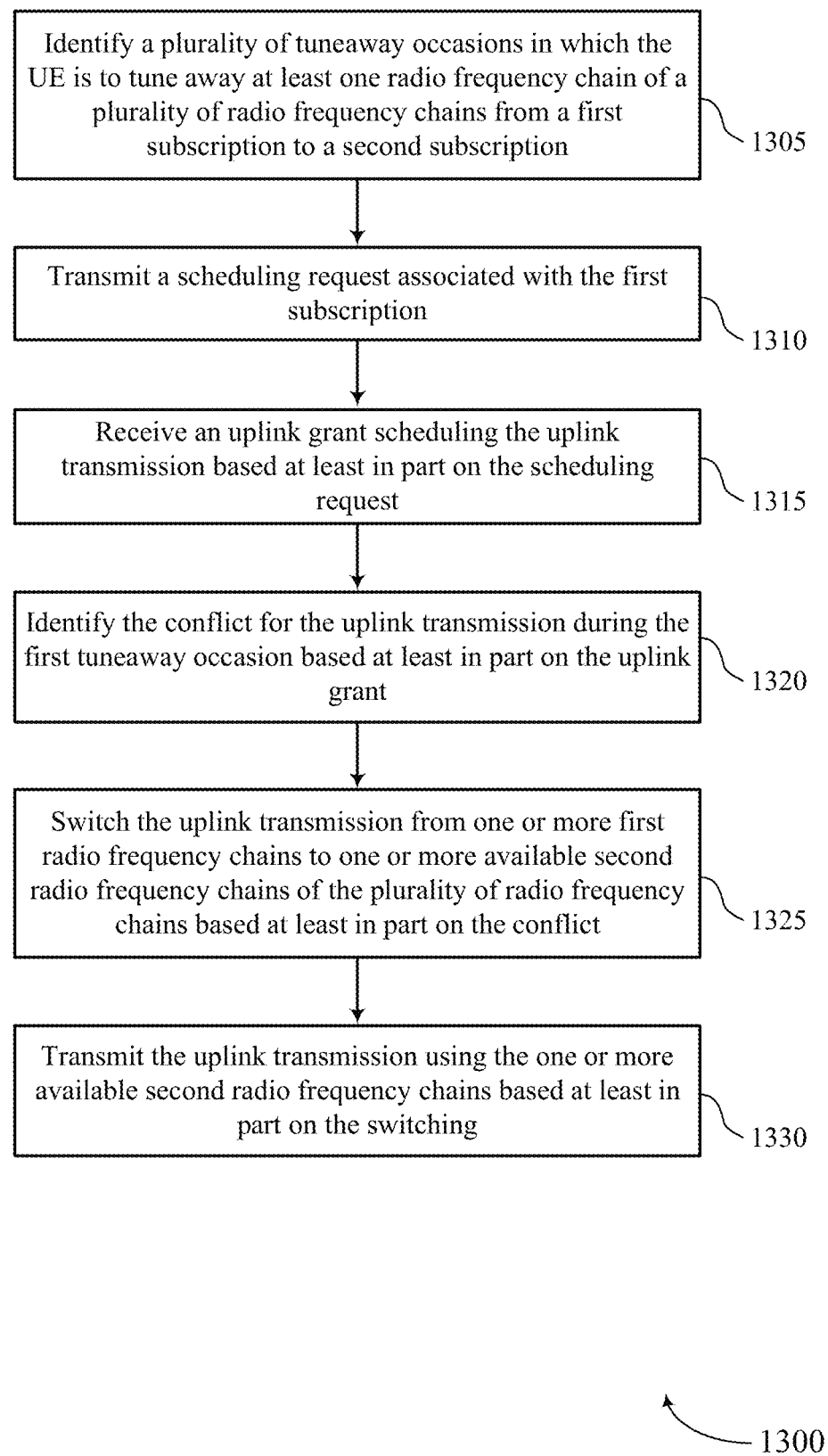

FIG. 13 shows a flowchart illustrating a method 1300 that supports intelligent transmission selection for enhancing uplink performance in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include identifying a set of multiple tuneaway occasions in which the UE is to tune away at least one RF chain of a set of multiple RF chains from a first subscription to a second subscription. The operations of 1305 may be performed in accordance with examples as disclosed herein. In some examples, aspects of the operations of 1305 may be performed by a tuneaway component 1025 as described with reference to FIG. 10.

At 1310, the method may include transmitting a scheduling request associated with the first subscription. The operations of 1310 may be performed in accordance with examples as disclosed herein. In some examples, aspects of the operations of 1310 may be performed by a scheduling request transmission component 1045 as described with reference to FIG. 10.

At 1315, the method may include receiving an uplink grant scheduling the uplink transmission based on the scheduling request. The operations of 1315 may be performed in accordance with examples as disclosed herein. In some examples, aspects of the operations of 1315 may be performed by an uplink grant reception component 1050 as described with reference to FIG. 10.

At 1320, the method may include identifying the conflict for the uplink transmission during the first tuneaway occasion based on the uplink grant. The operations of 1320 may be performed in accordance with examples as disclosed herein.

In some examples, aspects of the operations of 1320 may be performed by a conflict identification component 1030 as described with reference to FIG. 10.

At 1325, the method may include switching the uplink transmission from one or more first RF chains to one or more available second RF chains of the set of multiple RF chains based on the conflict. The operations of 1325 may be performed in accordance with examples as disclosed herein. In some examples, aspects of the operations of 1325 may be performed by a switching component 1035 as described with reference to FIG. 10.

At 1330, the method may include transmitting the uplink transmission using the one or more available second RF chains based on the switching. The operations of 1330 may be performed in accordance with examples as disclosed herein. In some examples, aspects of the operations of 1330 may be performed by an uplink transmission component 1040 as described with reference to FIG. 10.

Figure 14:
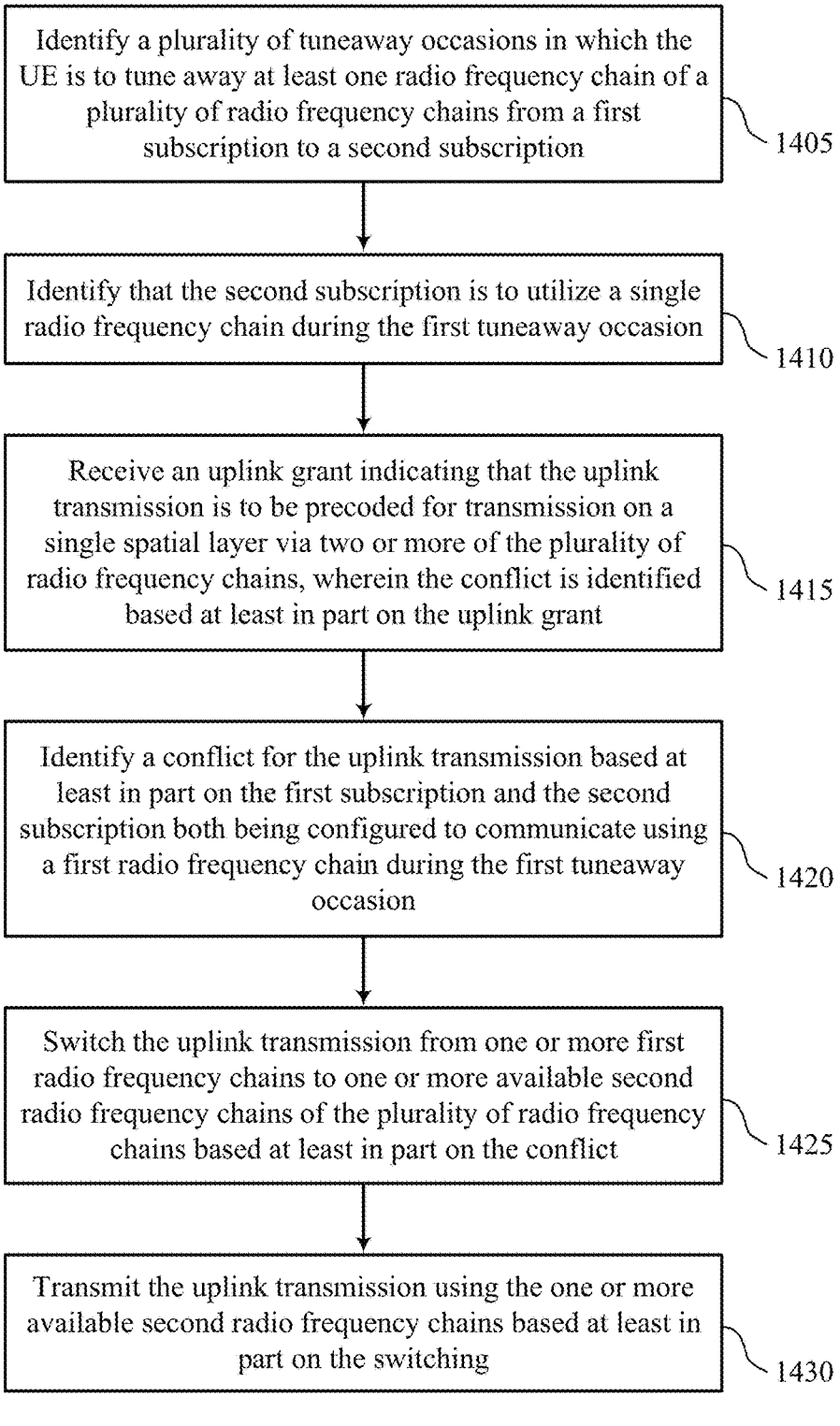

FIG. 14 shows a flowchart illustrating a method 1400 that supports intelligent transmission selection for enhancing uplink performance in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include identifying a set of multiple tuneaway occasions in which the UE is to tune away at least one RF chain of a set of multiple RF chains from a first subscription to a second subscription. The operations of 1405 may be performed in accordance with examples as disclosed herein. In some examples, aspects of the operations of 1405 may be performed by a tuneaway component 1025 as described with reference to FIG. 10.

At 1410, the method may include identifying that the second subscription is to utilize a single RF chain during the first tuneaway occasion. The operations of 1410 may be performed in accordance with examples as disclosed herein. In some examples, aspects of the operations of 1410 may be performed by a second subscription component 1055 as described with reference to FIG. 10.

At 1415, the method may include receiving an uplink grant indicating that the uplink transmission is to be precoded for transmission on a single spatial layer via two or more of the set of multiple RF chains, where the conflict is identified based on the uplink grant. The operations of 1415 may be performed in accordance with examples as disclosed herein. In some examples, aspects of the operations of 1415 may be performed by an uplink grant reception component 1050 as described with reference to FIG. 10.

At 1420, the method may include identifying the conflict for the uplink transmission based on the first subscription and the second subscription both being configured to communicate using a first RF chain during the first tuneaway occasion. The operations of 1420 may be performed in accordance with examples as disclosed herein. In some examples, aspects of the operations of 1420 may be performed by a conflict identification component 1030 as described with reference to FIG. 10.

At 1425, the method may include switching the uplink transmission from one or more first RF chains to one or more available second RF chains of the set of multiple RF chains based on the conflict. The operations of 1425 may be performed in accordance with examples as disclosed herein.

In some examples, aspects of the operations of 1425 may be performed by a switching component 1035 as described with reference to FIG. 10.

At 1430, the method may include transmitting the uplink transmission using the one or more available second RF chains based on the switching. The operations of 1430 may be performed in accordance with examples as disclosed herein. In some examples, aspects of the operations of 1430 may be performed by an uplink transmission component 1040 as described with reference to FIG. 10.

The following provides an overview of aspects of the present disclosure:

Aspect 1: A method at a UE, comprising: identifying a plurality of tuneaway occasions in which the UE is to tune away at least one RF chain of a plurality of RF chains from a first subscription to a second subscription; identifying a conflict for an uplink transmission associated with the first subscription during a first tuneaway occasion of the plurality of tuneaway occasions; switching the uplink transmission from one or more first RF chains to one or more available second RF chains of the plurality of RF chains based at least in part on the conflict; and transmitting the uplink transmission using the one or more available second RF chains based at least in part on the switching.

Aspect 2: The method of aspect 1, further comprising: transmitting a scheduling request associated with the first subscription; receiving an uplink grant scheduling the uplink transmission based at least in part on the scheduling request; and identifying the conflict for the uplink transmission during the first tuneaway occasion based at least in part on the uplink grant.

Aspect 3: The method of any of aspects 1 through 2, further comprising: identifying that the second subscription is to utilize a single RF chain during the first tuneaway occasion; and identifying the conflict for the uplink transmission based at least in part on the first subscription and the second subscription both being configured to communicate using a first RF chain during the first tuneaway occasion.

Aspect 4: The method of aspect 3, further comprising: receiving an uplink grant indicating that the uplink transmission is to be precoded for transmission on a single spatial layer via two or more of the plurality of RF chains, wherein the conflict is identified based at least in part on the uplink grant.

Aspect 5: The method of any of aspects 1 through 4, further comprising:
identifying that the second subscription is to utilize at least two RF chains of the plurality of RF chains during the first tuneaway occasion; and identifying the conflict for the uplink transmission during the first tuneaway occasion based at least in part on the first subscription and the second subscription both being configured to communicate using one or more of the at least two RF chains during the first tuneaway occasion.

Aspect 6: The method of aspect 5, further comprising: receiving an uplink grant indicating that the uplink transmission is to be precoded for transmission via two or more RF chains of the plurality of RF chains based at least in part on a scheduling request.

Aspect 7: The method of any of aspects 1 through 6, further comprising: identifying that the second subscription is to utilize a single RF chain of the plurality of RF chains during the first tuneaway occasion, wherein the uplink transmission is a single layer transmission; and identifying the conflict for the uplink transmission during the first tuneaway occasion based at least in part on the first subscription and the second subscription both being configured to communicate using a first RF chain during the first tuneaway occasion.

Aspect 8: The method of aspect 7, further comprising: receiving an uplink grant indicating that the uplink transmission is to be precoded for transmission via one RF chain of the plurality of RF chains based at least in part on a scheduling request, wherein the conflict is identified based at least in part on the uplink grant.

Aspect 9: The method of any of aspects 1 through 8, further comprising: identifying that the second subscription is to utilize at least two RF chains of the plurality of RF chains during the first tuneaway occasion, wherein the uplink transmission is a single layer transmission; and identifying the conflict for the uplink transmission during the first tuneaway occasion based at least in part on the first subscription and the second subscription both being configured to communicate using one or more of the at least two RF chains during the first tuneaway occasion.

Aspect 10: The method of aspect 9, further comprising: receiving an uplink grant indicating that the uplink transmission is to be precoded for transmission via two or more RF chains of the plurality of RF chains based at least in part on a scheduling request, wherein the conflict is identified based at least in part on the uplink grant.

Aspect 11: The method of any of aspects 1 through 10, further comprising: identifying that the second subscription is to utilize at least two RF chains of the plurality of RF chains during the first tuneaway occasion, wherein the uplink transmission is a multiple layer transmission; and identifying the conflict for the uplink transmission during the first tuneaway occasion based at least in part on the first subscription and the second subscription both being configured to communicate using one or more of the at least two RF chains during the first tuneaway occasion.

Aspect 12: The method of aspect 11, further comprising: receiving an uplink grant indicating that the uplink transmission is to be precoded for transmission via two or more RF chains of the plurality of RF chains based at least in part on a scheduling request, wherein the conflict is identified based at least in part on the uplink grant.

Aspect 13: The method of any of aspects 1 through 12, further comprising: transmitting a channel state feedback report indicating support for a defined transmission rank during the first tuneaway occasion; and receiving a downlink grant scheduling a downlink transmission during the first tuneaway occasion in accordance with the defined transmission rank.

Aspect 14: The method of any of aspects 1 through 13, further comprising: communicating a second uplink transmission of the first subscription via the first RF chains subsequent to the first tuneaway occasion.

Aspect 15: The method of any of aspects 1 through 14, wherein the first subscription is a DDS and the second subscription is an nDDS or wherein the first subscription is the nDDS and the second subscription is the DDS.

Aspect 16: The method of any of aspects 1 through 15, wherein each of the plurality of tuneaway occasions correspond to an idle mode activity associated with the second subscription that is an nDDS.

Aspect 17: The method of aspect 16, wherein the idle mode activity comprises page decoding, a cell search, a measurement, or any combination thereof.

Aspect 18: An apparatus comprising a processor; memory coupled with the processor; and instructions stored in the memory and executable by the processor to cause the apparatus to perform a method of any of aspects 1 through 17.

Aspect 19: An apparatus comprising at least one means for performing a method of any of aspects 1 through 17.

Aspect 20: A non-transitory computer-readable medium storing code the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      identify a plurality of tuneaway occasions in which the UE is to tune away at least one radio frequency chain of a plurality of radio frequency chains from a first subscription to a second subscription;
      identify a conflict for an uplink multiple-input multiple-output (MIMO) transmission via one or more first radio frequency chains associated with the first subscription during a first tuneaway occasion of the plurality of tuneaway occasions;
      switch, by the UE, the uplink MIMO transmission from the one or more first radio frequency chains to one or more available different second radio frequency chains of the plurality of radio frequency chains for the first tuneaway occasion based at least in part on the conflict associated with the one or more first radio frequency chains;
      transmit the uplink MIMO transmission using the one or more available different second radio frequency chains during the first tuneaway occasion; and
      perform an idle mode activity using the one or more first radio frequency chains during the first tuneaway occasion.

2. The UE of claim 1, wherein the one or more processors are individually or collectively operable to execute the code to cause the UE to:
   transmit a scheduling request associated with the first subscription;
   receive an uplink grant scheduling the uplink MIMO transmission based at least in part on the scheduling request; and
   identify the conflict for the uplink MIMO transmission during the first tuneaway occasion based at least in part on the uplink grant.

3. The UE of claim 1, wherein the one or more processors are individually or collectively operable to execute the code to cause the UE to:
   identify that the second subscription is to utilize a single radio frequency chain during the first tuneaway occasion; and
   identify the conflict for the uplink MIMO transmission based at least in part on the first subscription and the second subscription both being configured to communicate using a first radio frequency chain during the first tuneaway occasion.

4. The UE of claim 3, wherein the one or more processors are individually or collectively operable to execute the code to cause the UE to:
receive an uplink grant indicating that the uplink MIMO transmission is to be precoded for transmission on a single spatial layer via two or more of the plurality of radio frequency chains, wherein the conflict is identified based at least in part on the uplink grant.

5. The UE of claim 1, wherein the one or more processors are individually or collectively operable to execute the code to cause the UE to:
identify that the second subscription is to utilize at least two radio frequency chains of the plurality of radio frequency chains during the first tuneaway occasion; and
identify the conflict for the uplink MIMO transmission during the first tuneaway occasion based at least in part on the first subscription and the second subscription both being configured to communicate using one or more of the at least two radio frequency chains during the first tuneaway occasion.

6. The UE of claim 5, wherein the one or more processors are individually or collectively operable to execute the code to cause the UE to:
receive an uplink grant indicating that the uplink MIMO transmission is to be precoded for transmission via two or more radio frequency chains of the plurality of radio frequency chains based at least in part on a scheduling request.

7. The UE of claim 1, wherein the one or more processors are individually or collectively operable to execute the code to cause the UE to:
identify that the second subscription is to utilize a single radio frequency chain of the plurality of radio frequency chains during the first tuneaway occasion, wherein the uplink MIMO transmission is a single layer transmission; and
identify the conflict for the uplink MIMO transmission during the first tuneaway occasion based at least in part on the first subscription and the second subscription both being configured to communicate using a first radio frequency chain during the first tuneaway occasion.

8. The UE of claim 7, wherein the one or more processors are individually or collectively operable to execute the code to cause the UE to:
receive an uplink grant indicating that the uplink MIMO transmission is to be precoded for transmission via one radio frequency chain of the plurality of radio frequency chains based at least in part on a scheduling request, wherein the conflict is identified based at least in part on the uplink grant.

9. The UE of claim 1, wherein the one or more processors are individually or collectively operable to execute the code to cause the UE to:
identify that the second subscription is to utilize at least two radio frequency chains of the plurality of radio frequency chains during the first tuneaway occasion, wherein the uplink MIMO transmission is a single layer transmission; and
identify the conflict for the uplink MIMO transmission during the first tuneaway occasion based at least in part on the first subscription and the second subscription both being configured to communicate using one or more of the at least two radio frequency chains during the first tuneaway occasion.

10. The UE of claim 9, wherein the one or more processors are individually or collectively operable to execute the code to cause the UE to:
receive an uplink grant indicating that the uplink MIMO transmission is to be precoded for transmission via two or more radio frequency chains of the plurality of radio frequency chains based at least in part on a scheduling request, wherein the conflict is identified based at least in part on the uplink grant.

11. The UE of claim 1, wherein the one or more processors are individually or collectively operable to execute the code to cause the UE to:
identify that the second subscription is to utilize at least two radio frequency chains of the plurality of radio frequency chains during the first tuneaway occasion, wherein the uplink MIMO transmission is a multiple layer transmission; and
identify the conflict for the uplink MIMO transmission during the first tuneaway occasion based at least in part on the first subscription and the second subscription both being configured to communicate using one or more of the at least two radio frequency chains during the first tuneaway occasion.

12. The UE of claim 11, wherein the one or more processors are individually or collectively operable to execute the code to cause the UE to:
receive an uplink grant indicating that the uplink MIMO transmission is to be precoded for transmission via two or more radio frequency chains of the plurality of radio frequency chains based at least in part on a scheduling request, wherein the conflict is identified based at least in part on the uplink grant.

13. The UE of claim 1, wherein the one or more processors are individually or collectively operable to execute the code to cause the UE to:
transmit a channel state feedback report indicating support for a defined transmission rank during the first tuneaway occasion; and
receive a downlink grant scheduling a downlink transmission during the first tuneaway occasion in accordance with the defined transmission rank.

14. The UE of claim 1, wherein the one or more processors are individually or collectively operable to execute the code to cause the UE to:
communicate a second uplink transmission of the first subscription via the one or more first radio frequency chains subsequent to the first tuneaway occasion.

15. The UE of claim 1, wherein the first subscription is a default data subscription and the second subscription is a non-default data subscription or wherein the first subscription is the non-default data subscription and the second subscription is the default data subscription.

16. The UE of claim 1, wherein each of the plurality of tuneaway occasions correspond to an idle mode activity associated with the second subscription that is a non-default data subscription.

17. The UE of claim 16, wherein the idle mode activity comprises page decoding, a cell search, a measurement, or any combination thereof.

18. A method at a user equipment (UE), comprising:
identifying a plurality of tuneaway occasions in which the UE is to tune away at least one radio frequency chain of a plurality of radio frequency chains from a first subscription to a second subscription;
identifying a conflict for an uplink multiple-input multiple-output (MIMO) transmission via one or more first radio frequency chains associated with the first subscription during a first tuneaway occasion of the plurality of tuneaway occasions;

switching, by the UE, the uplink MIMO transmission from the one or more first radio frequency chains to one or more available different second radio frequency chains of the plurality of radio frequency chains for the first tuneaway occasion based at least in part on the conflict associated with the one or more first radio frequency chains;

transmitting the uplink MIMO transmission using the one or more available different second radio frequency chains during the first tuneaway occasion; and performing an idle mode activity during the one or more first radio frequency chains during the first tuneaway occasion.

19. The method of claim 18, further comprising:
transmitting a scheduling request associated with the first subscription;
receiving an uplink grant scheduling the uplink MIMO transmission based at least in part on the scheduling request; and
identifying the conflict for the uplink MIMO transmission during the first tuneaway occasion based at least in part on the uplink grant.

20. The method of claim 18, further comprising:
identifying that the second subscription is to utilize a single radio frequency chain during the first tuneaway occasion; and
identifying the conflict for the uplink MIMO transmission based at least in part on the first subscription and the second subscription both being configured to communicate using a first radio frequency chain during the first tuneaway occasion.

21. The method of claim 20, further comprising:
receiving an uplink grant indicating that the uplink MIMO transmission is to be precoded for transmission on a single spatial layer via two or more of the plurality of radio frequency chains, wherein the conflict is identified based at least in part on the uplink grant.

22. The method of claim 18, further comprising:
identifying that the second subscription is to utilize at least two radio frequency chains of the plurality of radio frequency chains during the first tuneaway occasion; and
identifying the conflict for the uplink MIMO transmission during the first tuneaway occasion based at least in part on the first subscription and the second subscription both being configured to communicate using one or more of the at least two radio frequency chains during the first tuneaway occasion.

23. The method of claim 22, further comprising:
receiving an uplink grant indicating that the uplink MIMO transmission is to be precoded for transmission via two or more radio frequency chains of the plurality of radio frequency chains based at least in part on a scheduling request.

24. The method of claim 18, further comprising:
identifying that the second subscription is to utilize a single radio frequency chain of the plurality of radio frequency chains during the first tuneaway occasion, wherein the uplink MIMO transmission is a single layer transmission; and
identifying the conflict for the uplink MIMO transmission during the first tuneaway occasion based at least in part on the first subscription and the second subscription both being configured to communicate using a first radio frequency chain during the first tuneaway occasion.

25. The method of claim 24, further comprising:
receiving an uplink grant indicating that the uplink MIMO transmission is to be precoded for transmission via one radio frequency chain of the plurality of radio frequency chains based at least in part on a scheduling request, wherein the conflict is identified based at least in part on the uplink grant.

26. The method of claim 18, further comprising:
identifying that the second subscription is to utilize at least two radio frequency chains of the plurality of radio frequency chains during the first tuneaway occasion, wherein the uplink MIMO transmission is a single layer transmission; and
identifying the conflict for the uplink MIMO transmission during the first tuneaway occasion based at least in part on the first subscription and the second subscription both being configured to communicate using one or more of the at least two radio frequency chains during the first tuneaway occasion.

27. The method of claim 26, further comprising:
receiving an uplink grant indicating that the uplink MIMO transmission is to be precoded for transmission via two or more radio frequency chains of the plurality of radio frequency chains based at least in part on a scheduling request, wherein the conflict is identified based at least in part on the uplink grant.

28. The method of claim 18, further comprising:
identifying that the second subscription is to utilize at least two radio frequency chains of the plurality of radio frequency chains during the first tuneaway occasion, wherein the uplink MIMO transmission is a multiple layer transmission; and
identifying the conflict for the uplink MIMO transmission during the first tuneaway occasion based at least in part on the first subscription and the second subscription both being configured to communicate using one or more of the at least two radio frequency chains during the first tuneaway occasion.

29. A user equipment (UE) for wireless communication, comprising:
means for identifying a plurality of tuneaway occasions in which the UE is to tune away at least one radio frequency chain of a plurality of radio frequency chains from a first subscription to a second subscription;
means for identifying a conflict for an uplink multiple-input multiple-output (MIMO) transmission via one or more first radio frequency chains associated with the first subscription during a first tuneaway occasion of the plurality of tuneaway occasions;
means for switching, by the UE, the uplink MIMO transmission from the one or more first radio frequency chains to one or more available different second radio frequency chains of the plurality of radio frequency chains for the first tuneaway occasion based at least in part on the conflict associated with the one or more first radio frequency chains;
means for transmitting the uplink MIMO transmission using the one or more available different second radio frequency chains during the first tuneaway occasion; and
means for performing an idle mode activity using the one or more first radio frequency chains during the first tuneaway occasion.

30. A non-transitory computer-readable medium storing code, the code comprising instructions executable by one or more processors to:
- identify a plurality of tuneaway occasions in which a user equipment (UE) is to tune away at least one radio frequency chain of a plurality of radio frequency chains from a first subscription to a second subscription;
- identify a conflict for an uplink multiple-input multiple-output (MIMO) transmission via one or more first radio frequency chains associated with the first subscription during a first tuneaway occasion of the plurality of tuneaway occasions;
- switch, by the UE, the uplink MIMO transmission from the one or more first radio frequency chains to one or more available different second radio frequency chains of the plurality of radio frequency chains for the first tuneaway occasion based at least in part on the conflict associated with the one or more first radio frequency chains;
- transmit the uplink MIMO transmission using the one or more available different second radio frequency chains during the first tuneaway occasion; and
- perform an idle mode activity using the one or more first radio frequency chains during the first tuneaway occasion.

* * * * *